(12) United States Patent
Cao et al.

(10) Patent No.: US 11,261,984 B2
(45) Date of Patent: Mar. 1, 2022

(54) COMBINATION REGULATOR VALVE

(71) Applicant: Engineered Controls International, LLC, Elon, NC (US)

(72) Inventors: Guangbin Cao, Shanghai (CN); Patrick N. Morefield, Burlington, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 16/648,148

(22) PCT Filed: Sep. 27, 2017

(86) PCT No.: PCT/CN2017/103667
§ 371 (c)(1),
(2) Date: Mar. 17, 2020

(87) PCT Pub. No.: WO2019/061071
PCT Pub. Date: Apr. 4, 2019

(65) Prior Publication Data
US 2020/0278043 A1    Sep. 3, 2020

(51) Int. Cl.
*F16K 17/30* (2006.01)
*F16K 31/126* (2006.01)

(52) U.S. Cl.
CPC ............ *F16K 17/30* (2013.01); *F16K 31/126* (2013.01); *F17C 2205/0338* (2013.01)

(58) Field of Classification Search
CPC .. F16K 17/30; F16K 31/126; Y10T 137/2663; Y10T 137/2652;

(Continued)

(56) References Cited

U.S. PATENT DOCUMENTS 959,397 A * 5/1910 Simmons ................ F16K 17/00
137/466
1,666,609 A * 4/1928 Soffge .................. G05D 16/163
137/382

(Continued)

FOREIGN PATENT DOCUMENTS

CH           98387        3/1923
CN        201462123       5/2010

(Continued)

OTHER PUBLICATIONS

International Search Report and Written Opinion for PCT/CN2017/103667 dated Apr. 16, 2018, 9 pp.

*Primary Examiner* — Jessica Cahill
(74) *Attorney, Agent, or Firm* — Neal, Gerber & Eisenberg LLP

(57) ABSTRACT

A combination regulator valve for conveying fluid is disclosed. The valve comprises a bonnet, a body, a flexible diaphragm, a first spring, and a spindle unit. The spindle unit comprises a pin, a first seat disc, and a seat screw. The bonnet is secured to the body. The flexible diaphragm is compressed between the bonnet and the body. The first spring is disposed in the bonnet. The spindle unit is disposed in the body. The first seat disc is disposed between the pin and the diaphragm. The first seat disc and the pin define a first void. The first spring biases the diaphragm toward the first seat disc. The seat screw is engaged with the body and is slidably engaged with the pin. The seat screw and the pin define a fluid passage in fluid communication with the first void.

20 Claims, 26 Drawing Sheets

(58) Field of Classification Search
CPC ........... Y10T 137/5994; Y10T 137/782; Y10T 137/7809; Y10T 137/7812; F17C 2205/0338
See application file for complete search history.

(56) References Cited

U.S. PATENT DOCUMENTS

| | | | | |
|---|---|---|---|---|
| 2,628,454 | A * | 2/1953 | Mueller | G05D 16/0686 137/484.6 |
| 2,661,578 | A * | 12/1953 | Niesemann | G05D 16/0655 137/484.8 |
| 2,761,464 | A * | 9/1956 | Faust | G05D 16/0672 137/116.5 |
| 2,788,798 | A * | 4/1957 | Mueller | G05D 16/0694 137/456 |
| 3,699,998 | A | 10/1972 | Baranowski, Jr. | |
| 4,418,924 | A * | 12/1983 | Mack | F16J 15/32 251/900 |
| 4,624,277 | A * | 11/1986 | Veite | G05D 16/0619 137/116.3 |
| 5,136,852 | A * | 8/1992 | Neeser | F17C 9/02 62/50.4 |
| 5,247,959 | A * | 9/1993 | Fretwell | F16K 11/105 137/116.3 |
| 8,517,043 | B2 * | 8/2013 | Hamm | G05D 16/0663 137/118.06 |
| 2011/0108751 | A1 * | 5/2011 | Hamm | G05D 16/0663 251/321 |
| 2011/0162730 | A1 | 7/2011 | Gotthelf | |
| 2016/0246309 | A1 * | 8/2016 | Leng | G05D 16/0666 |

FOREIGN PATENT DOCUMENTS

| | | |
|---|---|---|
| CN | 102052495 | 5/2011 |
| CN | 202091587 | 12/2011 |
| CN | 102691803 | 9/2012 |
| CN | 206246757 | 6/2017 |
| EP | 0517096 | 12/1992 |
| GB | 1401614 | 7/1975 |
| GB | 2535523 | 8/2016 |
| WO | WO1991002916 | 3/1991 |

* cited by examiner

COMBINATION REGULATOR VALVE

CROSS-REFERENCE

This application is a national stage entry of International Patent Application No. PCT/CN2017/103667 filed on Sep. 27, 2017, the entire contents of which are incorporated herein by reference.

TECHNICAL FIELD

This disclosure generally relates to a valve that may be configured to convey cryogenic fluid.

BACKGROUND

Cryogenic fluid is often stored in a pressurized tank. The pressure may fluctuate due to temperature variations, filling of the tank, or dispensing of fluid from the tank. The tank may include a one or more valves for (a) regulating pressure of the tank and (b) enabling fluid to be dispensed from the tank.

SUMMARY

This application is defined by the appended claims. The description summarizes aspects of exemplary embodiments and should not be used to limit the claims. Other implementations are contemplated in accordance with the techniques described herein, as will be apparent upon examination of the following drawings and detailed description, and such implementations are intended to be within the scope of this application.

In an embodiment, a valve for conveying fluid disclosed herein comprises a bonnet, a body, a flexible diaphragm, a first spring, and a spindle unit. The spindle unit comprises a pin, a first seat disc, and a seat screw. The bonnet is secured to the body. The flexible diaphragm is compressed between the bonnet and the body. The first spring is disposed in the bonnet. The spindle unit is disposed in the body. The first seat disc is disposed between the pin and the diaphragm. The first seat disc and the pin define a first void. The first spring biases the diaphragm toward the first seat disc. The seat screw is engaged with the body and is slidably engaged with the pin. The seat screw and the pin define a fluid passage in fluid communication with the first void.

In another embodiment, a valve for conveying fluid comprises a bonnet, a body, a flexible diaphragm, a first spring, and a spindle unit. The bonnet is secured to the body. The body defines a first port, a second port, and a third port. The flexible diaphragm is compressed between the bonnet and the body. The first spring is disposed in the bonnet. The spindle unit is disposed in the body and comprises a pin, a first seat disc, and a seat screw. The first seat disc is disposed between the pin and the diaphragm. The first seat disc and the pin define a first void. The first spring biases the diaphragm toward the first seat disc. The seat screw is engaged with the body and slidably engaged with the pin. The seat screw and the pin define a fluid passage in fluid communication with the first void. The second port is in fluid communication with the fluid passage and third port is in fluid communication with an undersurface of the diaphragm.

In a further embodiment, a valve for conveying fluid comprises a bonnet, a body, a flexible diaphragm, a first spring, and a spindle unit. The bonnet is secured to the body. The body defines a first port, a second port, and a third port. The flexible diaphragm is compressed between the bonnet and the body. The first spring is disposed in the bonnet. The spindle unit is disposed in the body and comprises a pin, a first seat disc, a seat screw, a seat, and a second seat disc. The first seat disc is disposed between the pin and the diaphragm. The first seat disc and the pin define a first void. The first spring biases the diaphragm toward the first seat disc. The seat screw threadably engages the body and slidably engages the pin. The seat screw and the pin define a fluid passage in fluid communication with the first void. The seat is retained in the body by the seat screw and slidably engages the pin. The second seat disc is secured to the pin and sealingly engages the seat. The valve is configured to have (a) a first position where the first port and the second port are in internal fluid communication and neither the first port nor the second port are in internal fluid communication with the third port, (b) a second position where the second port and the third port are in internal fluid communication and neither the second port nor the third port are in internal fluid communication with the first port, and (c) a third position where none of the first port, the second port, and the third port are in internal fluid communication. In the first position, the second seat disc is disengaged from the seat and the first seat disc is sealingly engaged with the pin. In the second position, the second seat disc is sealingly engaged with the seat and the first seat disc is disengaged from the pin. In the third position, the second seat disc is sealingly engaged with the seat and the first seat disc is sealingly engaged with the pin.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles.

The scope of the present invention is intended to cover all such embodiments that may fall within the scope of the appended claims, either literally or under the doctrine of equivalents. The specification describes exemplary embodiments which are not intended to limit the claims or the claimed inventions. Features described in the specification, but not recited in the claims, are not intended to limit the claims.

Figure 1:
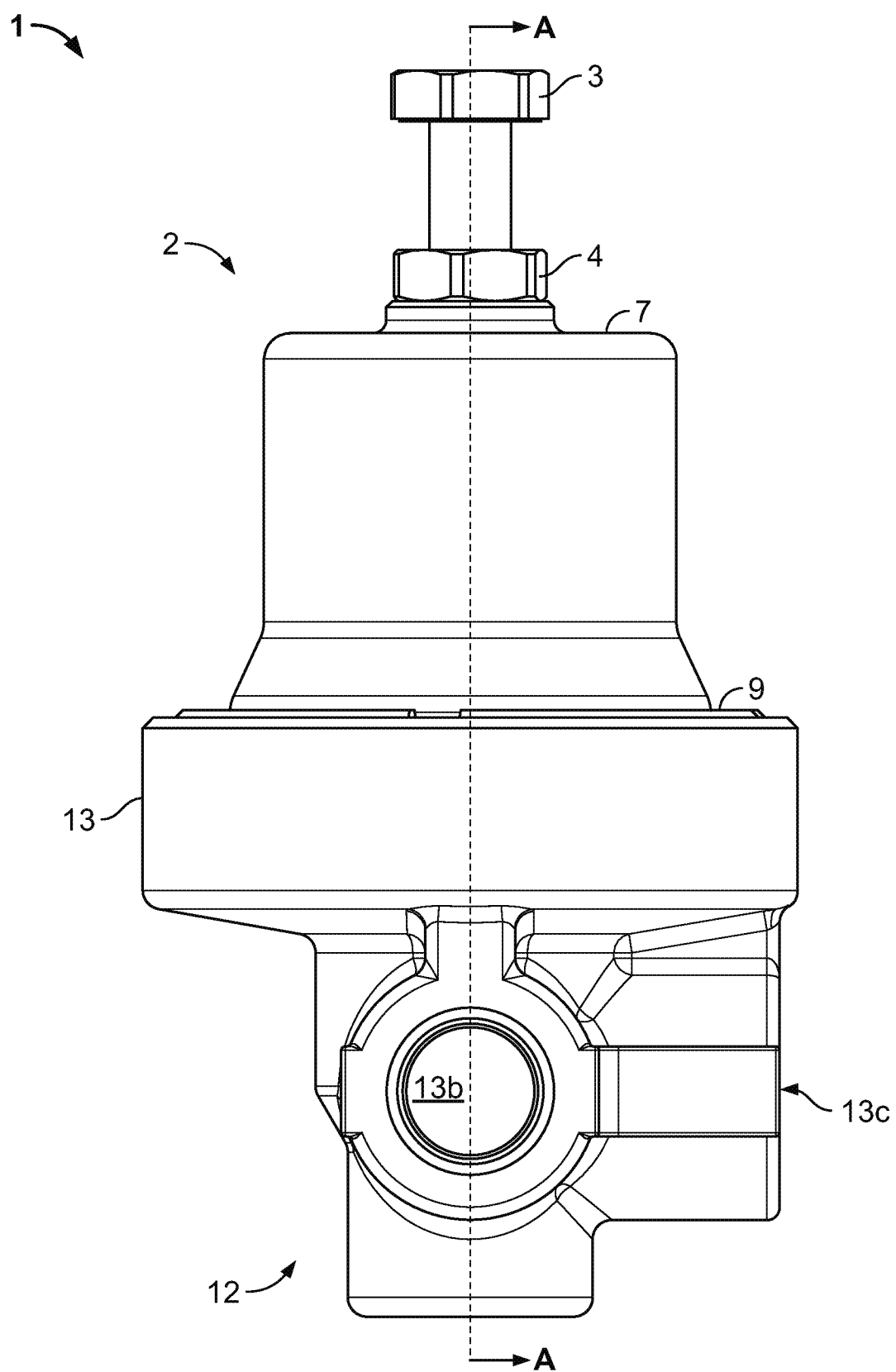
FIG. 1 is a side view of a valve.
Figure 2:
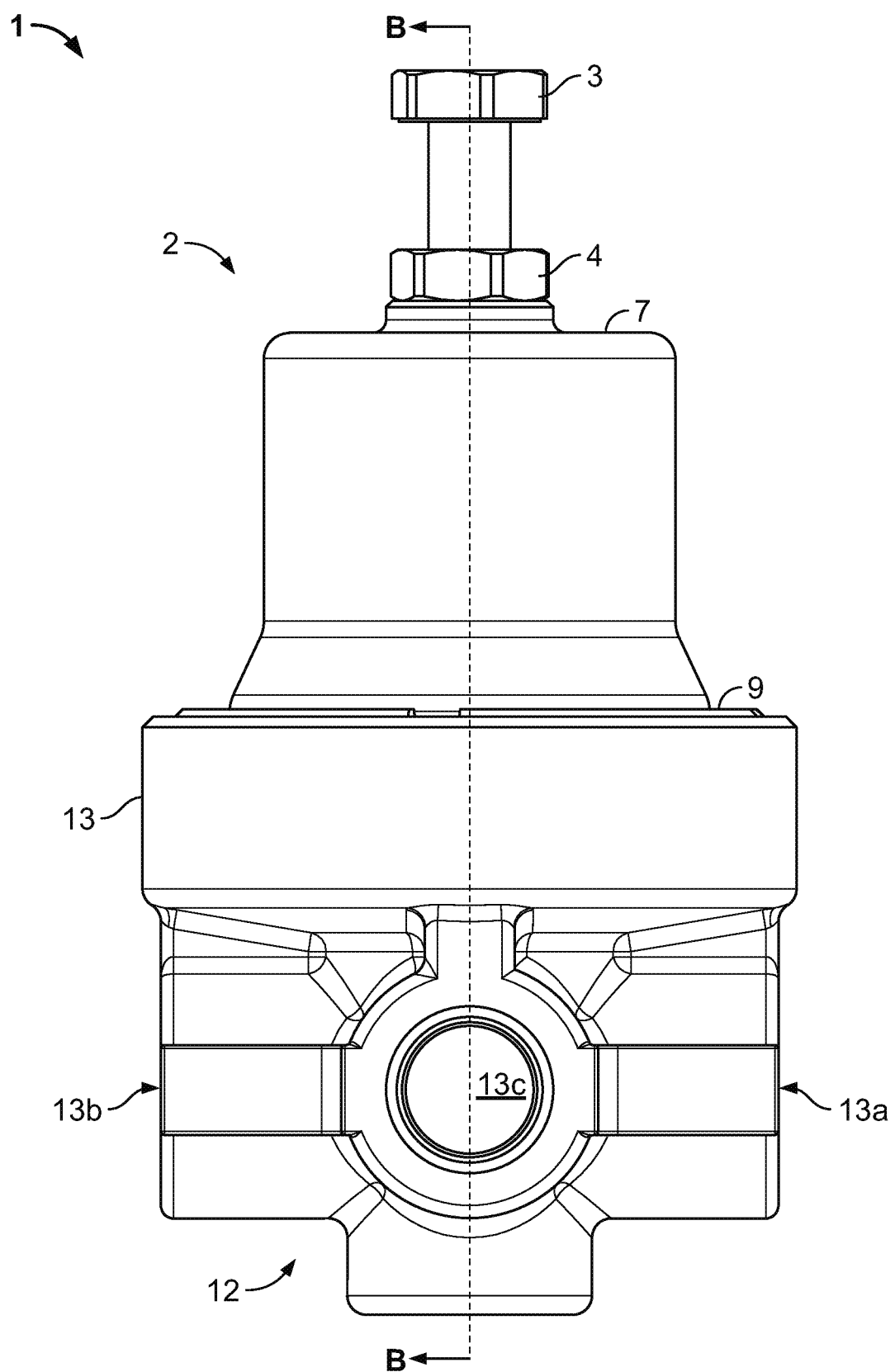
FIG. 2 is a front view of the valve.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. Further, each of the drawings may be drawn to a different scale (e.g., the scale of FIG. 1 may be different than the scale of FIG. 28).

Some features may be described using relative terms such as top, bottom, vertical, rightward, leftward, etc. It should be appreciated that such relative terms are only for reference with respect to the appended drawings. These relative terms are not meant to limit the disclosed embodiments. More specifically, it is contemplated that the valves depicted in the appended drawings will be oriented in various directions in practice and that the relative orientation of features will change accordingly.

As stated above, the present specification is intended to be taken as a whole and interpreted in accordance with the principles of the present invention as taught herein and understood by one of ordinary skill in the art.

FIGS. 1 to 33 illustrate exemplary structural features of a combination regulator valve 1. With reference to FIGS. 1-4, valve 1 has a longitudinal axis L and includes a setting portion 2 joined with a flowing portion 12. The combination regulator valve 1 serves as a fluid economizer and as a fluid regulator. When serving as a fluid economizer, valve 1 accepts fluid at a second port 13$b$ and expels the fluid through a third port 13$c$. When serving as a fluid regulator, valve 1 accepts fluid at a first port 13$a$ and expels the fluid through the second port 13$b$.

Setting portion 2 enables user adjustment of the one or more pressures that cause valve 1 to perform the regulator function and the economizer function. More specifically, setting portion 2 enables user adjustment via compression of a first spring 8. The compression of the first spring 8 controls an amount of fluid pressure necessary in flowing portion 12 to (a) cause a diaphragm 28 to upwardly flex, (b) cause the diaphragm 28 to downwardly flex, and (c) enable the diaphragm 28 to occupy a neutral or flat position.

Setting portion 2 includes an adjustable screw 3, a nut 4, a ball 5, a spring support 6, a bonnet 7, a first spring 8, a bonnet screw 9, and a diaphragm plate 10. Screw 3 is threaded into the nut 4 and the bonnet 7. One end of the screw 3 bears on the ball 5, which is seated in the spring support 6. The spring support 6 and the diaphragm plate 10 compress the first spring 8 therebetween.

A user may adjust the compression of the first spring 8 by rotating the screw 3 with respect to the nut 4 and the bonnet 7. When the screw 3 is rotated in a first direction (e.g., clockwise), the screw 3 moves downward, thus pushing the ball 5 downward. Because the ball 5 is seated between the screw 3 and the spring support 6, downward motion of the ball 5 and the screw 3 force the spring support 6 downward. The diaphragm plate 10 is seated on the diaphragm 28, which generally opposes downward motion. Consequently, compression of the first spring 8 increases from the smaller distance between the spring support 6 and the diaphragm plate 10. When compression of the first spring 8 increases, the first spring 8 exerts more downward force against the diaphragm plate 10.

When the screw 3 is rotated in a second, opposite direction (e.g., counter-clockwise), the screw 3 moves upwards. The first spring 8 presses the spring support 6 upward until the ball 5 contacts the screw 3. Compression of the first spring 8 decreases due to the increased distance between the spring support 6 and the diaphragm plate 10. When compression of the first spring 8 decreases, the first spring 8 exerts less downward force against the diaphragm plate 10.

The flowing portion 12 is configured to (a) enable internal fluid communication between the first port 13$a$ and the second port 13$b$, (b) enable internal fluid communication between the second port 13$b$ and the third port 13$c$, and (c) disable internal fluid communication between the first, second and third ports 13$a$, 13$b$, 13$c$. With reference to FIGS.

Figure 3:
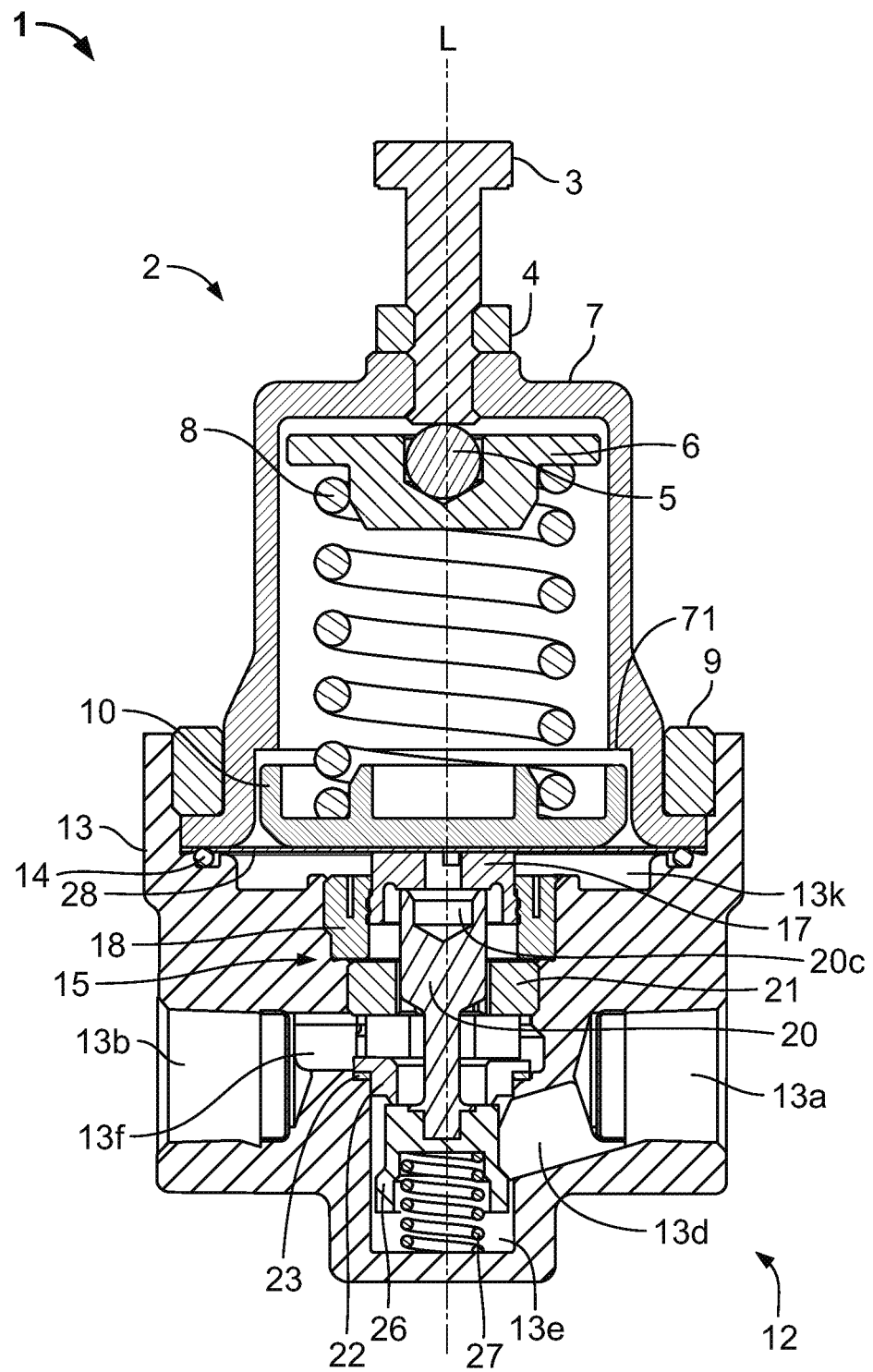
FIG. 3 is a cross-sectional view of the valve along section line A-A of FIG. 1.
Figure 4:
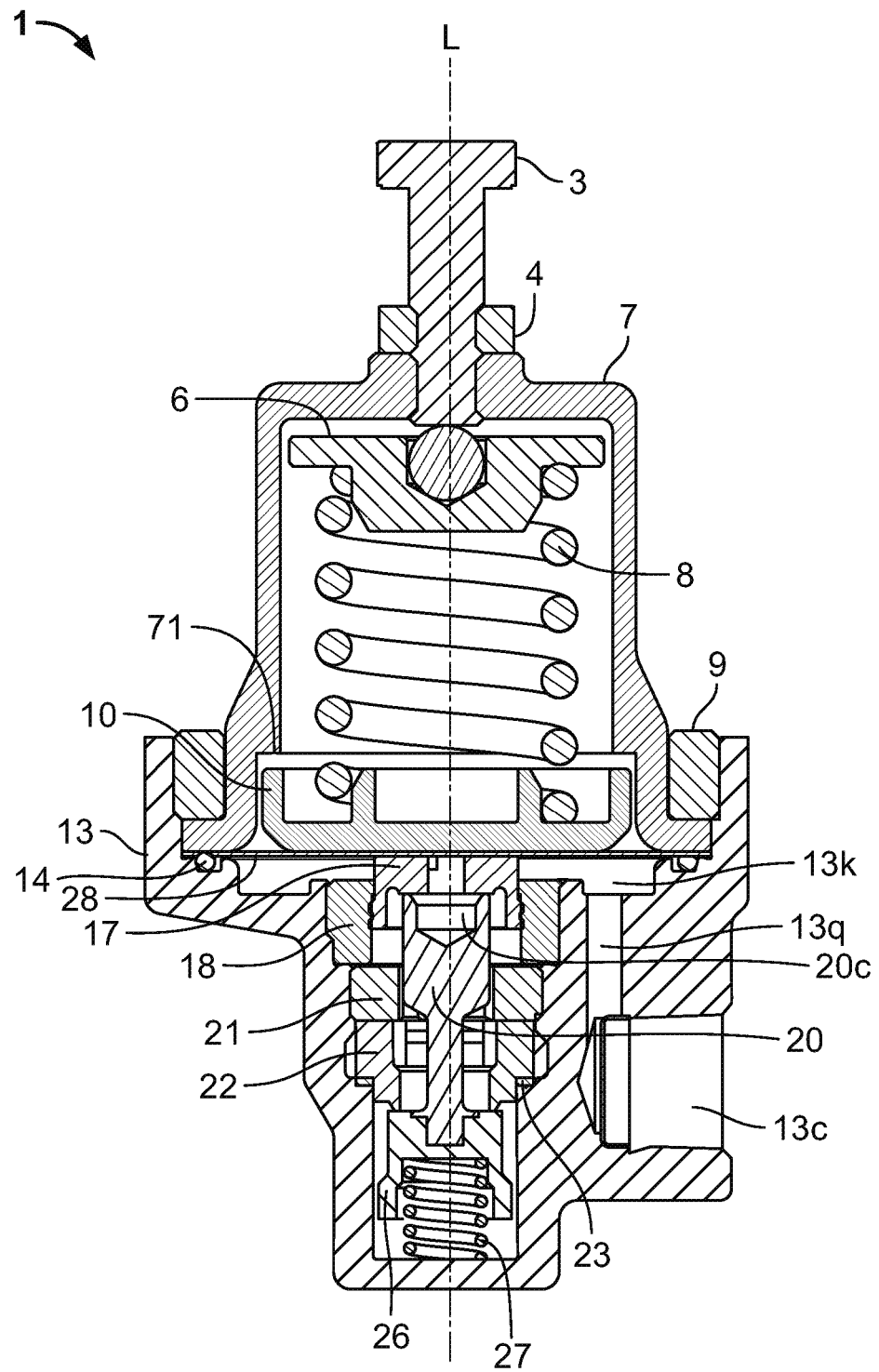
FIG. 4 is a cross-sectional view of the valve along section line B-B of FIG. 2.
Figure 5:
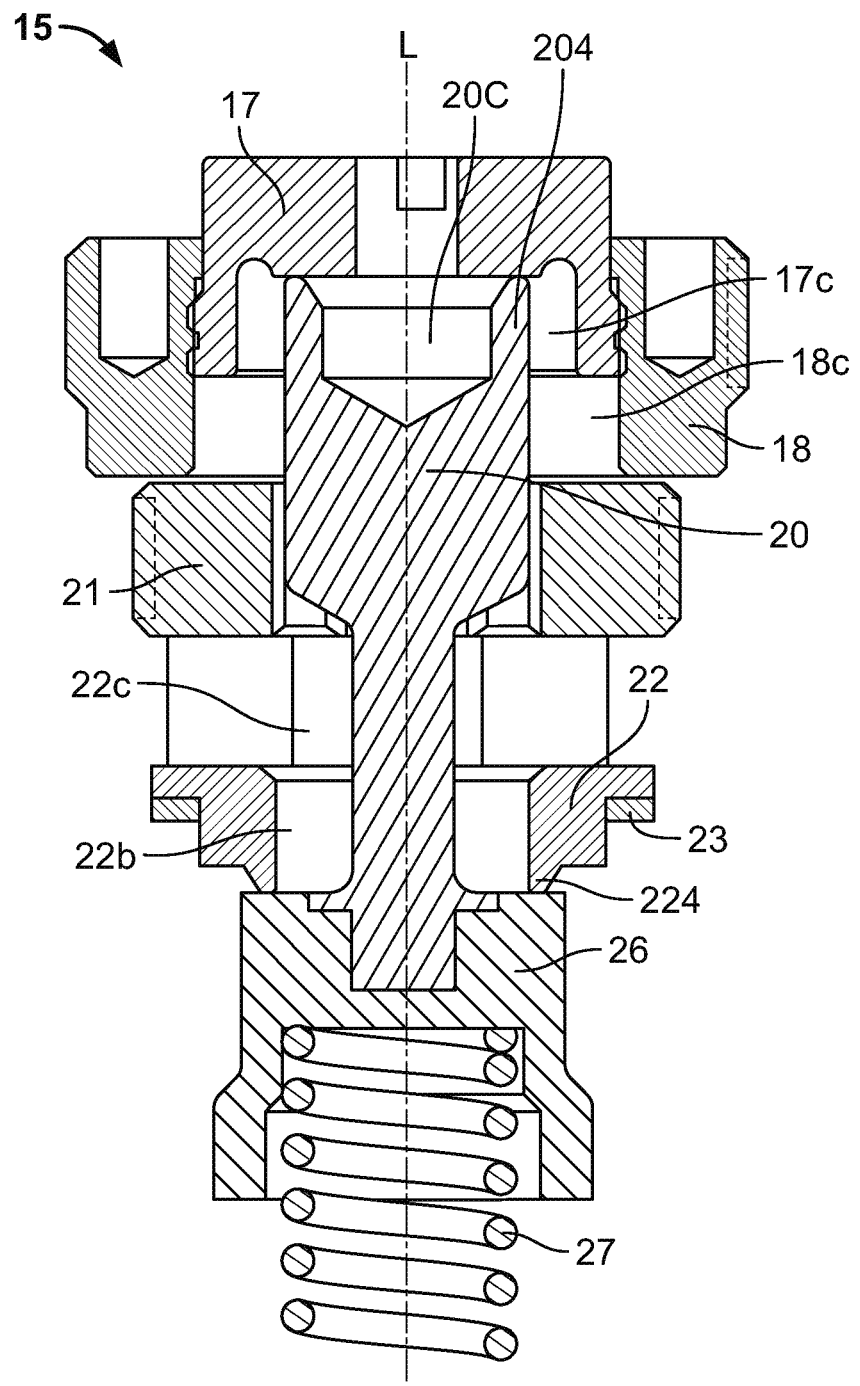
FIG. 5 is a cross-sectional view of a spindle unit of the valve.
Figure 6:
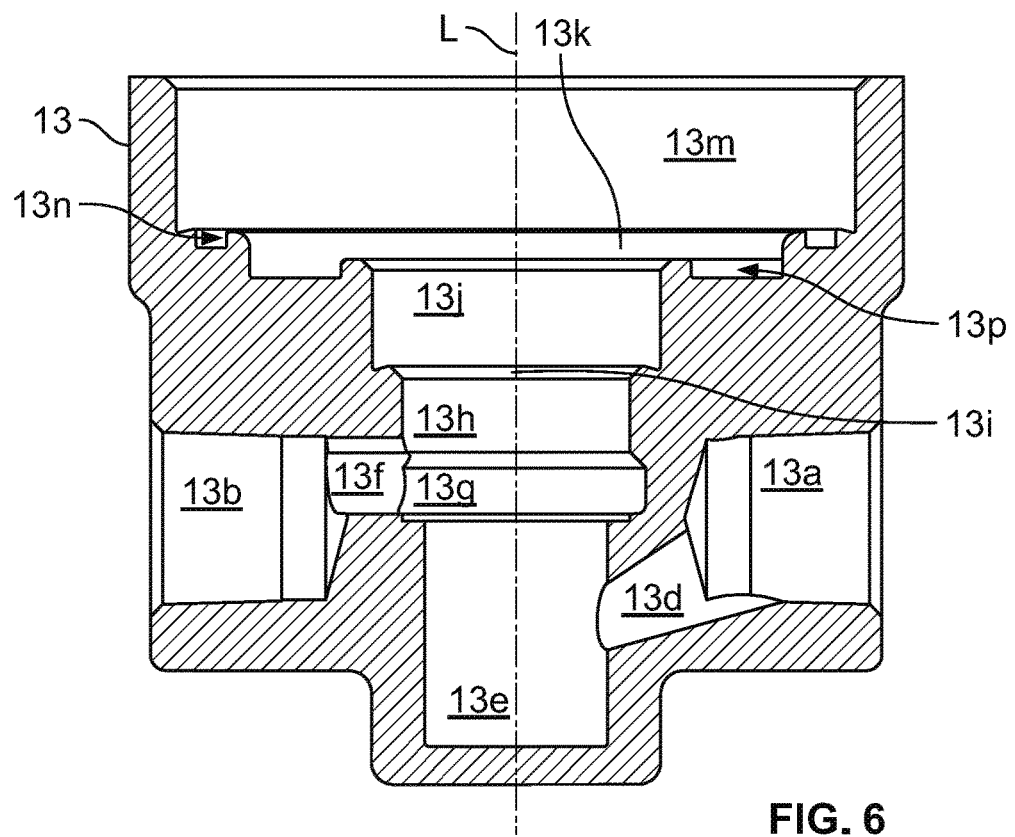
FIG. 6 is a cross-sectional view of a body of the valve along section line A-A of FIG. 1.
Figure 7:
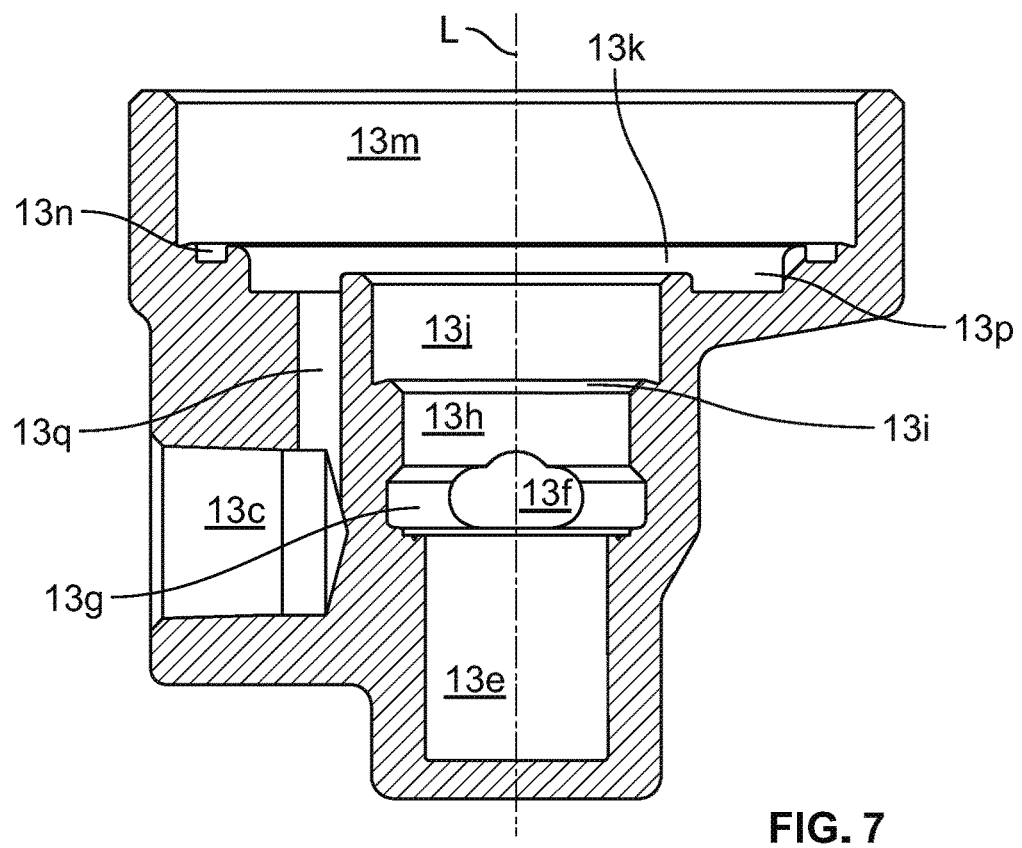
FIG. 7 is a cross-sectional view of the body along section line B-B of FIG. 2.
Figure 8:
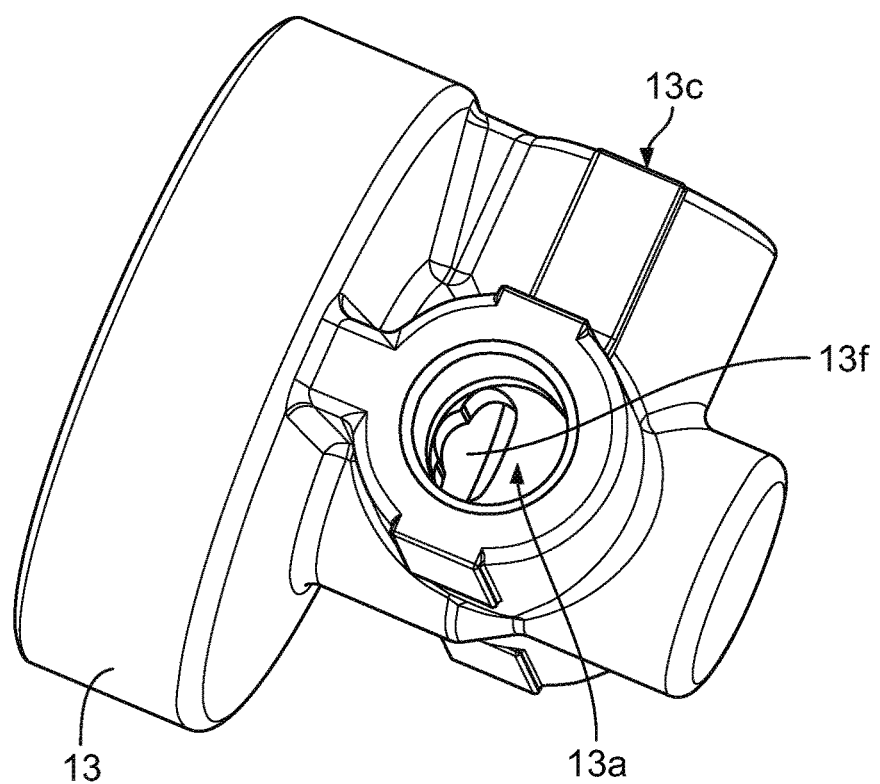
FIG. 8 is lower isometric view of the body.

1-5, flowing portion 12 includes a body 13, an o-ring 14, a spindle unit 15, and the diaphragm 28. As shown in FIGS. 3-5, the spindle unit 15 includes a first seat disc 17 (also called a pin engager or a sealing surface engager), a guide 18, a pin 20 (also called an extender), a seat screw 21, a seat 22, a washer 23, a second seat disc 26 (also called a seat engager or a sealing surface engager), and a second spring 27.

With reference to FIGS. 3-5, the bonnet screw 9 compresses the bonnet 7 against first and second outer portions of the diaphragm 28. The first outer portion of the diaphragm 28 is compressed between the o-ring 14 and the bonnet 7. The second outer portion is radially outward of the first outer portion and is compressed between the body 13 and the bonnet 7. Thus, the diaphragm 28 discourages fluid leakage from void 13k and past the bonnet 7 at the first outer portion and at the second outer portion.

The guide 18 is threaded into the body 13 and slidably captures the seat disc 17. The guide 18 inwardly bears on the seat disc 17 to longitudinally align the seat disc 17 along the longitudinal axis L. The seat screw 21 inwardly bears on the pin 20 to longitudinally align the pin 20 along the longitudinal axis L. The seat screw 21 is not sealingly engaged with the pin 20. Void 17c is in fluid communication with void 22c via the seat screw 21 as will be explained in greater detail in conjunction with FIGS. 16-17. The pin 20 includes a valve seat 204 for sealingly engaging first seat disc 17. Further, the seat screw 21 is threaded into the body and axially bears on the seat 23 to capture the seat 23 in the body 13. The washer 23 is compressed between the seat 22 and the body 13 to discourage fluid from flowing between the body 13 and the seat 22.

The seat 22 sealingly engages the second seat disc 26 at valve seat 224. The pin 20 is inserted into the second seat disc 26 to longitudinally align the second seat disc 26 with the longitudinal axis L. The second seat disc 26 receives the second spring 27 to capture the second spring 27 between the second seat disc 26 and the body 13 and to longitudinally align the second spring 27 with the longitudinal axis L. An inner surface of the second seat disc 26 bears on the second spring 27.

As stated above, the first spring 8 biases the diaphragm 28 downward. Fluid pressure in void 13k biases the diaphragm 28 upward. Additionally, with reference to FIGS. 3-5, fluid pressure in voids 17c and 18c, bears on the first seat disc 17 to bias diaphragm 28 upward. The second spring 27 biases diaphragm 28 upward, but only until the second seat disc 26 engages the seat 22. Similarly, fluid pressure in void 13e biases diaphragm 28 upward, but only until the second seat disc 26 engages the seat 22. It should be understood that the diaphragm 28 may be naturally biased toward the upwardly flexed position, a neutral (i.e., flat) position, or the downwardly flexed position as a result of internal stresses induced during manufacturing.

The above-described biases and fluid pressure apply force to the diaphragm 28 and thus determine whether the diaphragm 28 is upwardly flexed, downwardly flexed, or neutral. It should be appreciated that because void 13k has a greater area parallel to diaphragm 28 than voids 17c, pressure in void 13k influences the position of diaphragm 28 to a greater extent than pressure in void 17c.

Upon installation, a user cannot access the third spring 27 or the diaphragm 28 without removing the bonnet 7. Thus, by rotating the screw 3, the user may control the fluid pressure in voids 13k and 17c that causes diaphragm 28 to upwardly flex and the fluid pressure in voids 13k and 17c that enables the diaphragm 28 to downwardly flex. More specifically, when the user moves the screw 3 downward, a greater minimum amount of pressure in voids 13k and/or 17c is needed to cause the diaphragm 28 to upwardly flex and a lesser maximum amount of pressure in voids 13k and/or 17c enables the diaphragm 28 to downwardly flex. In contrast, when the user moves the screw 3 upward, a lesser minimum amount of pressure in voids 13k and/or 17c is needed to cause the diaphragm 28 to upwardly flex and a greater maximum amount of pressure in voids 13k and/or 17c enables the diaphragm 28 to downwardly flex.

Upon flexing downward past the neutral or flat position, the diaphragm 28 presses the seat disc 17 downward until the seat disc 17 sealingly engages the pin 20. The spindle unit 15, more specifically the second spring, 27, is configured such that when the diaphragm 28 flexes downward, the first seat disc 17 sealingly engages the pin 20 before the second seat disc 26 overcomes the upward bias of the second spring 27 to release from seat 22. By virtue of contact between the first seat disc 17 and the pin 20, the pin 20 overcomes the upward bias of the second spring 27 and moves downward with the seat disc 17.

With reference to FIGS. 3-5, when the diaphragm 28 downwardly flexes, the second seat disc 26, which is engaged with the pin 20, moves downward and away (i.e., disengages) from the seat 22, which is static with respect to the body 13. Upon disengagement between the seat disc 26 and the seat 22, fluid communication between the first port 13a and the second port 13b occurs via voids 13d, 13e, 22c, 22b, and 13f. Because seat disc 17 sealingly engages pin 20, internal fluid communication is blocked between (a) the first and second ports 13a, 13b and (b) the third port 13c through flowing portion 12. Put differently, internal fluid communication only occurs between the first and second ports 13a and 13b.

As diaphragm 28 flexes downward, compression of at least the second spring 27 increases, thus increasing the upward force exerted by the second spring 27 against the second seat disc 26 and the pin 20. Eventually, the upward force exerted by the second spring 27 will overcome the downward force applied by the first spring 8 against the diaphragm 28, thus arresting further downward movement of the pin 20.

When fluid pressure in void 13k flexes the diaphragm 28 upward past the neutral or flat position, the second spring 27 pushes second seat disc 26 against seat 22 such that second seat disc 26 occupies the closed position shown in FIGS. 3-4. Because the second seat disc 26 stops against seat screw 22, pin 20 cannot move upward with first seat disc 17. Further, fluid pressure in voids 22c, 18c, and 17c urges the first seat disc 17 away from the pin 20.

With reference to FIGS. 3-5, fluid pressure in void 13k spread across the surface area of diaphragm 28 produces a first force. Fluid pressure in void 13k spread across the surface area of the topside of the first seat disc 17 produces a second force. Fluid pressure in void 17c spread across the surface area of the underside of the first seat disc 17 radially outside of the valve seat 204 produces a third force. When the first force overcomes the downward force of the first spring 8, the diaphragm 28 flexes upwardly. When the third force overcomes the second force, the first seat disc 17 slides in the guide 18 and disengages from the pin 20. In other words, a first minimum fluid pressure in void 13k spread across the surface area of the diaphragm 28 overcomes the downward force of the first spring 8 and a second minimum pressure in void 17c spread across the bottom surface area of the first seat disc 17 outside of the valve seat 204 overcomes the downward force of fluid pressure in void 13k spread across the top surface area of the first seat disc 17. Thus, fluid communication is enabled between the second port 13b and the third port 13c via voids 13f, 22b, 22c, 18c, 17c, 13k, and 13q.

By virtue of the engagement between the second seat disc 26 and the seat 22, internal fluid communication is blocked between (a) the first port 13a and (b) the second and third ports 13b, 13c. Put differently, internal fluid communication only occurs between the second and third ports 13b, 13c. The spindle unit 15 is configured such that when the diaphragm 28 flexes upward, the second seat disc 26 sealingly engages the seat 22 before the first seat disc 17 disengages from pin 20.

A shoulder 71 of the bonnet 70 serves as a stop for the diaphragm plate 10. The combination of the shoulder 71 and the diaphragm plate 10 thus prevent the diaphragm 28 from upwardly flexing past a certain degree, irrespective of fluid pressure.

When the diaphragm 28 is in the neutral or flat position, as shown in FIGS. 3-4, the diaphragm 28 counters the upward force of fluid pressure in void 17c to keep the first seat disc 17 sealingly engaged with pin 20. The second spring 27 overcomes downward bias of the diaphragm 28 against the pin 20 and causes the second seat disc 26 to sealingly engage the seat 22. As a result, the valve 1 blocks internal fluid communication between all of ports 13a, 13b, 13c.

The spindle unit 15 is sized and configured to for the valve seat 204 to sealingly bear against the bottom of the first seat disc 17 when the diaphragm 28 is in the neutral position. Additionally, the spindle unit 15 is configured for the second seat disc 26 to sealingly bear against the seat 22 when the diaphragm 28 is in the neutral position.

As shown in FIGS. 6-10, the body 13 defines (a) first, second, and third ports 13a, 13b, 13c and (b) voids 13d, 13e, 13f, 13g, 13h, 13i, 13j, 13k, 13m, 13n, 13p, and 13q. For the reader's convenience and to avoid confusion, the void numbering skips 131 and 13o.

The first, second, and third ports 13a, 13b, 13c are partially conical and transversely extending in the body 13. The first and second ports 13a, 13b are opposite one another with collinear central axes. The third port 13c has a central axis perpendicular to the central axes of the first and second ports 13a, 13b.

Void 13d is cylindrical with a central axis angled with respect to the longitudinal axis L and the central axis of the first port 13a. Void 13e is cylindrical and linked to void 13a via void 13d. Void 13e has a central axis parallel to and collinear with the longitudinal axis L. Void 13e accommodates the second seat disc 26, an end of the second spring 27, at least a portion of the seat 22, and at least a portion of the pin 20. Void 13f has a central axis perpendicular to the longitudinal axis L, has three lobes, and links the second port 13b with void 22b of the seat 22.

Figure 10:
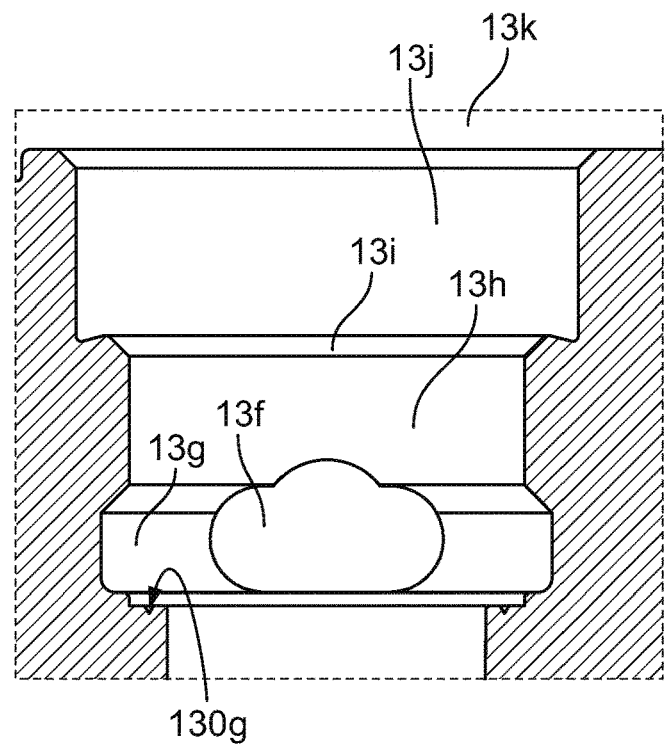
FIG. 10 is a partial enlargement of the cross-sectional view of the body of FIG. 7.

Void 13g is disc shaped and accommodates at least a portion of the seat 22, at least a portion of the pin 20, and the washer 23. Void 13g may be sized and configured to enable fluid in void 22b of the seat 22 to communicate with void 13f without passing through void 13g. A central axis of void 13g is collinear with the longitudinal axis L. Void 13g has a maximum diameter exceeding the maximum diameters of voids 13e and 13h. As shown in FIG. 10, void 13g includes ring-shaped void 130g. When viewed in cross section, void 130g is triangular. The washer 23 sits directly above void 130g.

Void 13h is cylindrical. Inner surfaces of the body 13 defining void 13h are threaded to threadably engage with the seat screw 21. A central axis of void 13h is parallel to the longitudinal axis L. Void 13h accommodates the threaded portion of the seat screw 21 and at least a portion of the pin 20. Void 13i is a conical transition between voids 13h and 13j. Void 13i has a larger major diameter than the non-threaded portion of void 13h and a central axis collinear with longitudinal axis L.

Void 13j is cylindrical. Inner surfaces of the body 13 defining void 13j are threaded to threadably engage with the guide 18. A central axis of void 13j is parallel to the longitudinal axis L. Void 13j accommodates at least portions of the guide 18, the pin 20, and the first seat disc 17. Void 13k is cylindrical with a central axis collinear with the longitudinal axis L. Void 13k has a greater diameter than any of voids 13e, 13g, 13h, 13i, and 13j. Void 13k accommodates at least portions of the guide 18 and the first seat disc 17. When downwardly flexed, the diaphragm 28 protrudes into void 13k.

Figure 9:
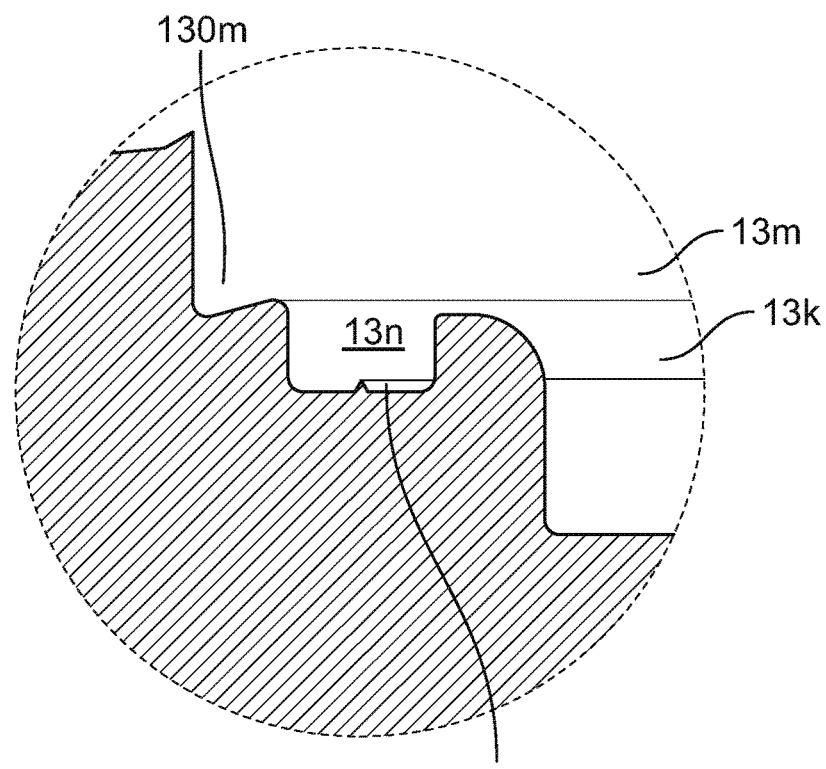
FIG. 9 is a partial enlargement of the cross-sectional view of the body of FIG. 7.

Void 13m is cylindrical with a central axis collinear with the longitudinal axis L. A portion of the inner surfaces of the body 13 defining void 13m are threaded to threadably engage with the bonnet screw 9. A portion of the inner surfaces defining void 13m are not threaded to enable the bonnet 7 to outwardly bear against the body 13. Void 13m accommodates the bonnet screw 9, a portion of the bonnet 7, at least a portion of the diaphragm plate 10, a portion of the first spring 8, and the diaphragm 28 when in the neutral or upwardly flexed positions. As shown in FIG. 9, void 13m includes a ringed portion 130m which extends into the body 13 at a non-perpendicular angle with respect to the longitudinal axis L.

Void 13n is ring-shaped with a central axis collinear with the longitudinal axis L. Void 13n accommodates the o-ring 14. As shown in FIG. 9, the bottom of void 13n is uneven by virtue of an upwardly extending surface 132 configured to deform the o-ring 14. Void 13p is ring-shaped, lies below void 13k, and has a central axis collinear with the longitudinal axis L. Void 13q has a central axis offset from, but parallel with the longitudinal axis L and connects port 13c with void 13k via void 13p.

Figure 11:
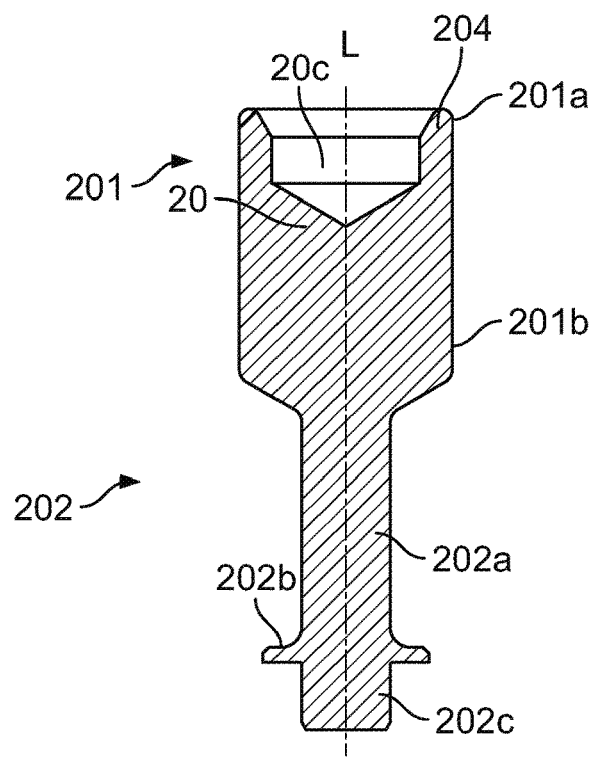
FIG. 11 is a cross-sectional view of a pin of the spindle unit.

With reference to FIG. 11, the pin 20 includes an upper portion 201 and a lower portion 202. The upper portion 201 includes a protruding portion 201a and a main portion 201b. The protruding portion 201a defines void 20c. Void 20c is partially conical and has a central axis collinear with the longitudinal axis L and fluidly communicates with void 13k via the first seat disc 17. The protruding portion 201a includes the valve seat 204 for sealingly engaging the first seat disc 17. The lower portion 202 includes an extension portion 202a, a guiding portion 202b, and an engaging portion 202c. The guiding portion 202b engages a top surface of the second seat disc 26 to longitudinally stabilize the second seat disc 26. The engaging portion 202c extends into the second seat disc 26.

Figure 12:
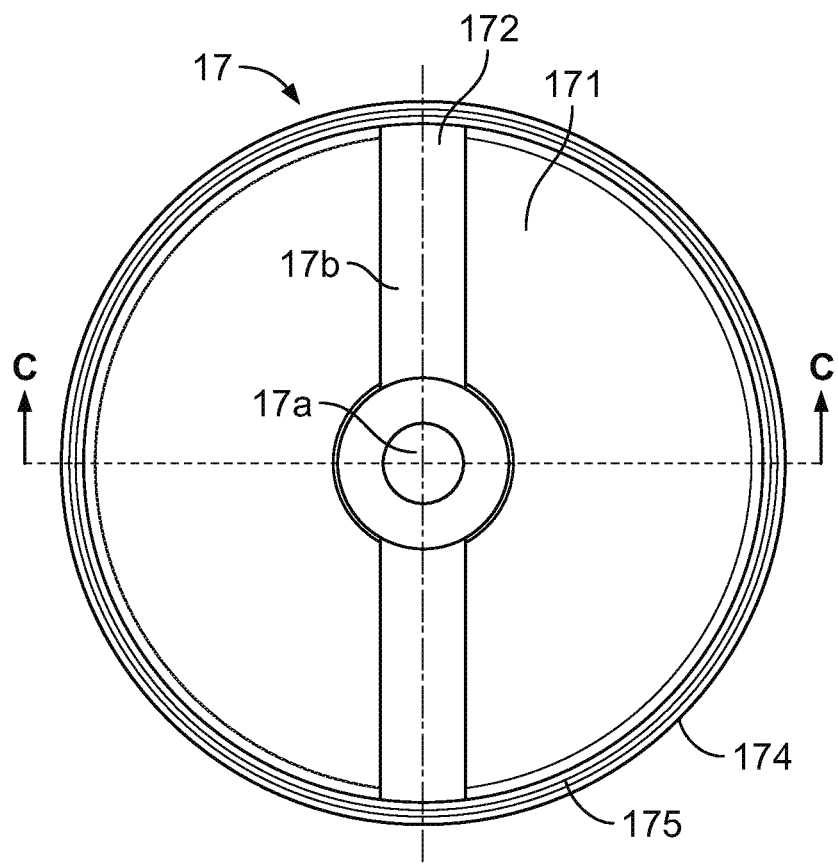
FIG. 12 is a top view of a first seat disc of the spindle unit.
Figure 13:
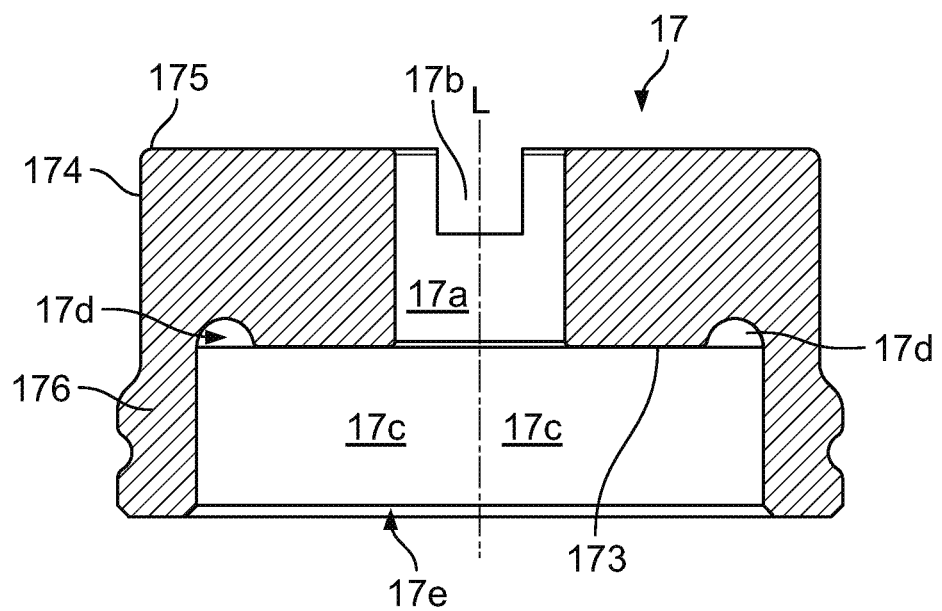
FIG. 13 is a cross-sectional view of the first seat disc along section line C-C of FIG. 12.

As shown in FIGS. 12-13, the first seat disc 17 defines voids 17a, 17b, 17c, 17d, and 17e. Voids 17a and 17c are cylindrical and void 17c has a greater diameter than void 17a. Void 17b is channel-shaped and perpendicular to the longitudinal axis L. Void 17c is in fluid communication with void 13k of the body 13 via voids 17a and 17b. Void 17d is ring-shaped and extends from void 17c. Void 17e is conical. Voids 17a, 17b, 17c, 17d, and 17e respectively have central axes collinear with the longitudinal axis L.

The first seat disc 17 includes first and second upper surfaces 171 and 172. The first upper surface 171 is circular and elevated above the second upper surface 172. The first upper surface 171 bears against the diaphragm 28. The second upper surface 172 defines a bottom of the channel-shaped void 17b disposed below the first upper surface 171 such that at least when the diaphragm 28 is in the neutral or flat position, the first upper surface 171, but not the second upper surface 172, bears on the diaphragm 28. The first seat disc 17 includes an inner surface 173, configured to compressively seal against pin 20. As shown in FIGS. 12-13, the first seat disc 17 includes an outer perimeter 174 transitionally connected to the first upper surface 171 via rounded edges 175. As shown in FIG. 13, the outer perimeter 174 includes one or more outwardly extending sealing rings 176 to sealingly engage with the guide 18.

Figure 13A:
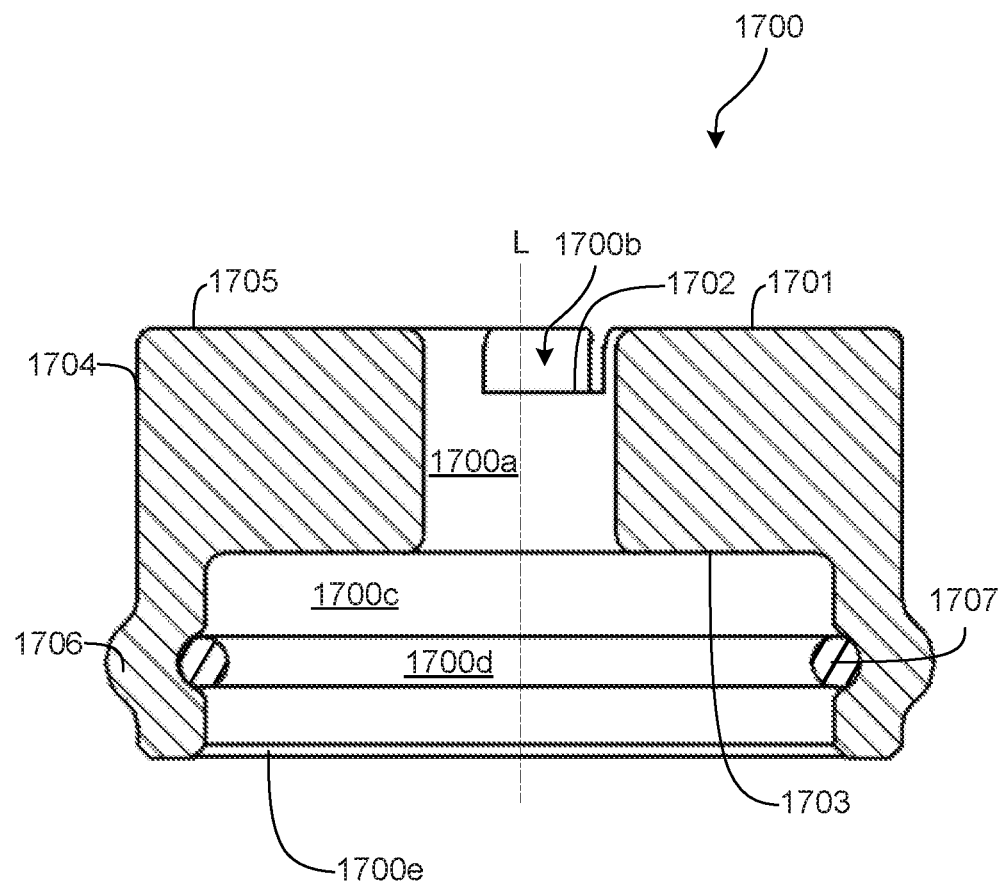
FIG. 13A is a cross-sectional view of an alternative first seat disc.

FIG. 13A illustrates an alternative first seat disc 1700 that may be substituted into the spindle 15 of FIG. 5 in place of the first seat disc 17. As shown in FIG. 13A, the alternative first seat disc 1700 defines voids 1700a, 1700b, 1700c, 1700d, and 1700e. Voids 1700a and 1700c are cylindrical and void 1700c has a greater diameter than void 1700a. Void 1700b is channel-shaped and perpendicular to the longitudinal axis L when the alternative first seat disc 1700 is installed in the spindle 15. Void 1700c is in fluid communication with void 13k of the body 13 via voids 1700a and 1700b when the alternative first seat disc 1700 is installed in the spindle 15. Void 1700d is toroidal and extends from void 1700c. Void 1700e is conical. Voids 1700a, 1700b, 1700c, 1700d, and 1700e respectively have central axes collinear with the longitudinal axis L.

The alternative first seat disc 1700 includes first and second upper surfaces 1701 and 1702. The first upper surface 1701 is circular and elevated above the second upper surface 1702. The first upper surface 1701 bears against the diaphragm 28. The second upper surface 1702 defines a bottom of the channel-shaped void 1700b disposed below the first upper surface 1701 such that at least when the diaphragm 28 is in the neutral or flat position, the first upper surface 1701, but not the second upper surface 1702, bears on the diaphragm 28. The alternative first seat disc 1700 includes an inner surface 1703, configured to compressively seal against pin 20. As shown in FIG. 13A, the first seat disc 1700 includes an outer perimeter 1704 transitionally connected to the first upper surface 1701 via rounded edges 1705. As shown in FIG. 13A, the outer perimeter 1704 includes an outwardly extending sealing ring 1706 to sealingly engage with the guide 18. The alternative first seat disc 1700 includes a support ring 1707 disposed in void 1700d. The support ring 1707 provides outward support (e.g., radial stiffening) as the alternative first seat disc 1700 sealingly engages with the guide 18 via the sealing ring 1706. In some examples, the support ring 1707 is metallic (e.g., steel, stainless steel, brass, bronze, aluminum, etc.).

Figure 14:
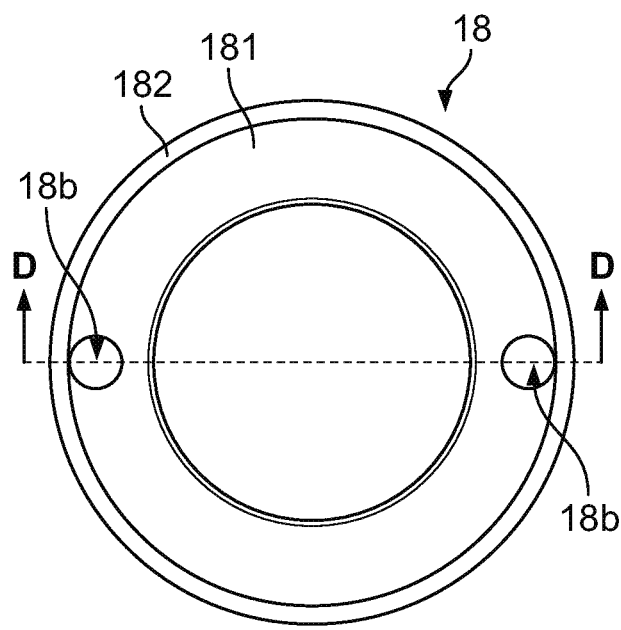
FIG. 14 is a top view of a guide of the spindle unit.
Figure 15:
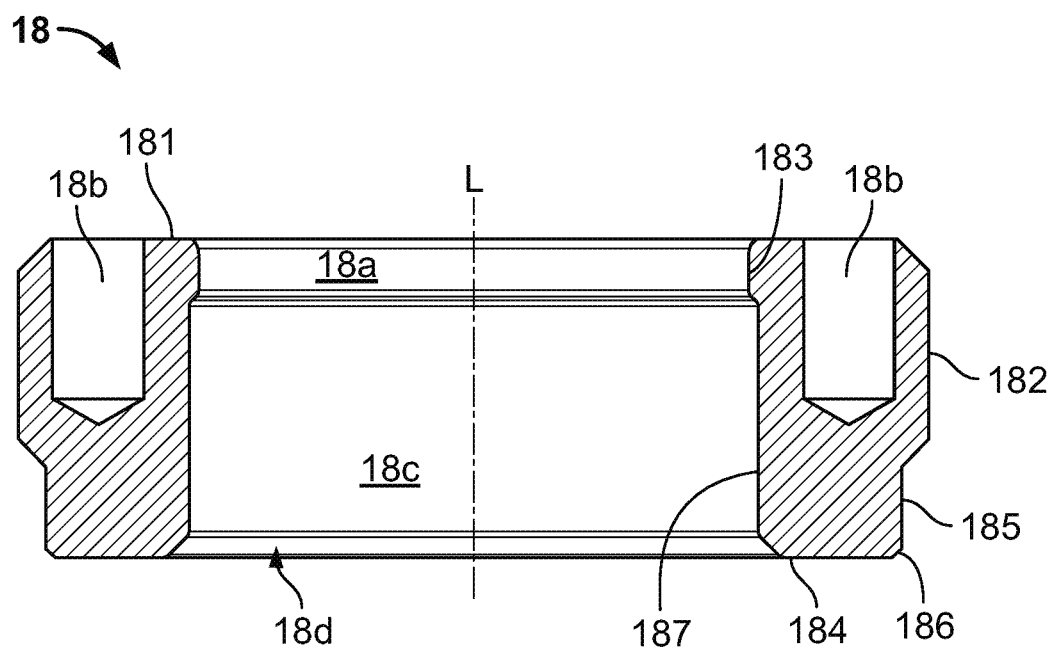
FIG. 15 is a cross-sectional view of the guide along section line D-D of FIG. 14.

As shown in FIGS. 14-15, the guide 18 includes an upper surface 181, outer threads 182, an inner lip 183, a bottom surface 184, an unthreaded outer perimeter 185, a rounded edge 186, and an inner surface 187. The guide 18 threadably engages with the body 13 via the outer threads 182. The guide 18 defines voids 18a, 18b, 18c, and 18d. A tool may be inserted into voids 18b to tighten threaded engagement between the guide 18 and the body 13. Void 18a has cylindrical and conical portions, has a central axis collinear with the longitudinal axis L, and is defined by the inner lip 183. Void 18c is cylindrical with a diameter greater than the cylindrical portion of void 18a, has a central axis collinear with the longitudinal axis L. Void 18c is transitionally connected to the cylindrical portion of void 18a via the conical portion of void 18a. Void 18d is conical and transitionally connects the inner surface 187 to the bottom surface 184. The unthreaded outer perimeter 185 is transitionally connected to the bottom surface 184 via the rounded edge 186. The inner lip 183 has a diameter less than the inner surface 187. The inner lip 183 bears against the outer perimeter 174 of the first seat disc 17 and captures the first seat disc 17 via the sealing rings 176.

Figure 16:
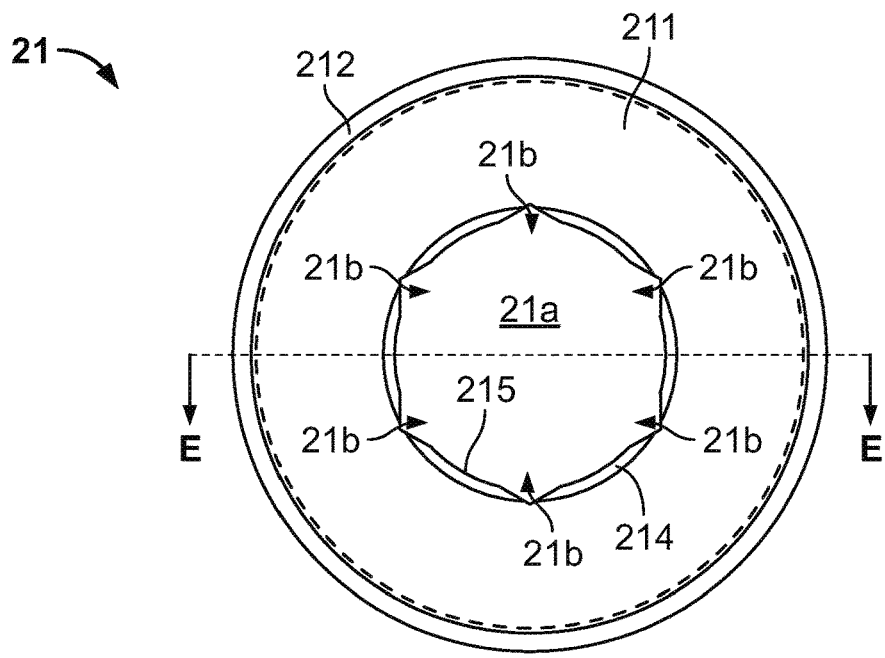
FIG. 16 is a top view of a seat screw of the spindle unit.
Figure 17:
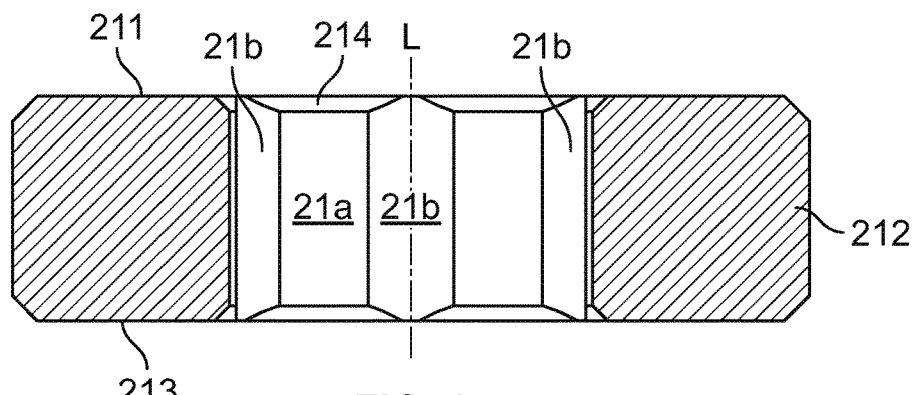
FIG. 17 is a cross-sectional view of the seat screw along section line E-E of FIG. 15.

As shown in FIGS. 16-17, the seat screw 18 includes an upper surface 211, outer threads 212, a bottom surface 213, at least one chamfer 214, and an inner surface 215. Voids 21a and 21b are defined by the inner surface 215. Void 21a is cylindrical and has a central axis collinear with the longitudinal axis L. Each void 21b forms a corner in communication with void 21a. In other words, the voids 21b are extensions (e.g., offshoots) of cylindrical void 21a. The seat screw 21 is threadably engaged with the body 13 via the outer threads 212. Void 21a accommodates the pin 20 to slidably engage the pin 20 with the inner surface 215 and each void 21b forms a fluid passage between the seat screw 21 and the pin 20. In operation, fluid communicates between voids 22c and 18c (shown in FIGS. 3-4) via voids 21b. A tool may be inserted into voids 21b to tighten threaded engagement between the seat screw 21 and the body 13. In other words, the voids 21b serve to convey fluid when the pin 20 is inserted into void 21a and to provide at least one tool engagement surface. In the illustrated example of FIG. 16, the voids 21b are arranged hexagonally. It should be understood that the seat screw 21 may define any number of voids 21b greater than zero and that the voids 21b may be any shape (e.g., rectangular, lobed, etc.). Chamfer 214 provides a lead-in to facilitate insertion of the pin 20 into the seat screw 21 and sliding engagement of the pin 20 with the seat screw 21.

Figure 18:
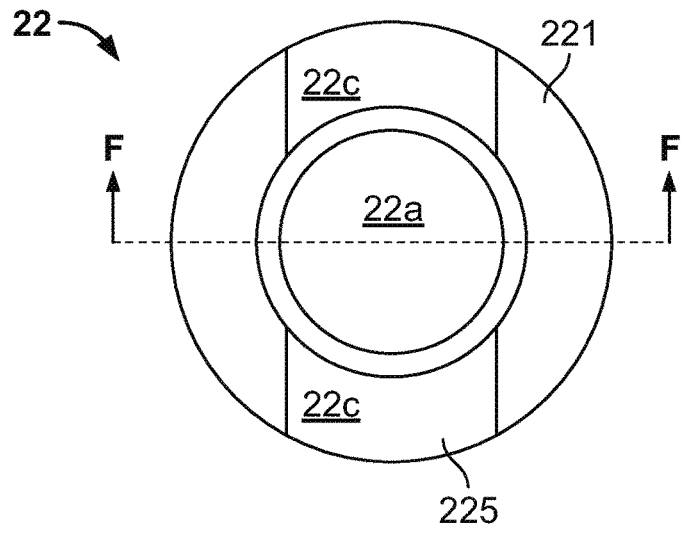
FIG. 18 is a top view of a seat of the spindle unit.
Figure 19:
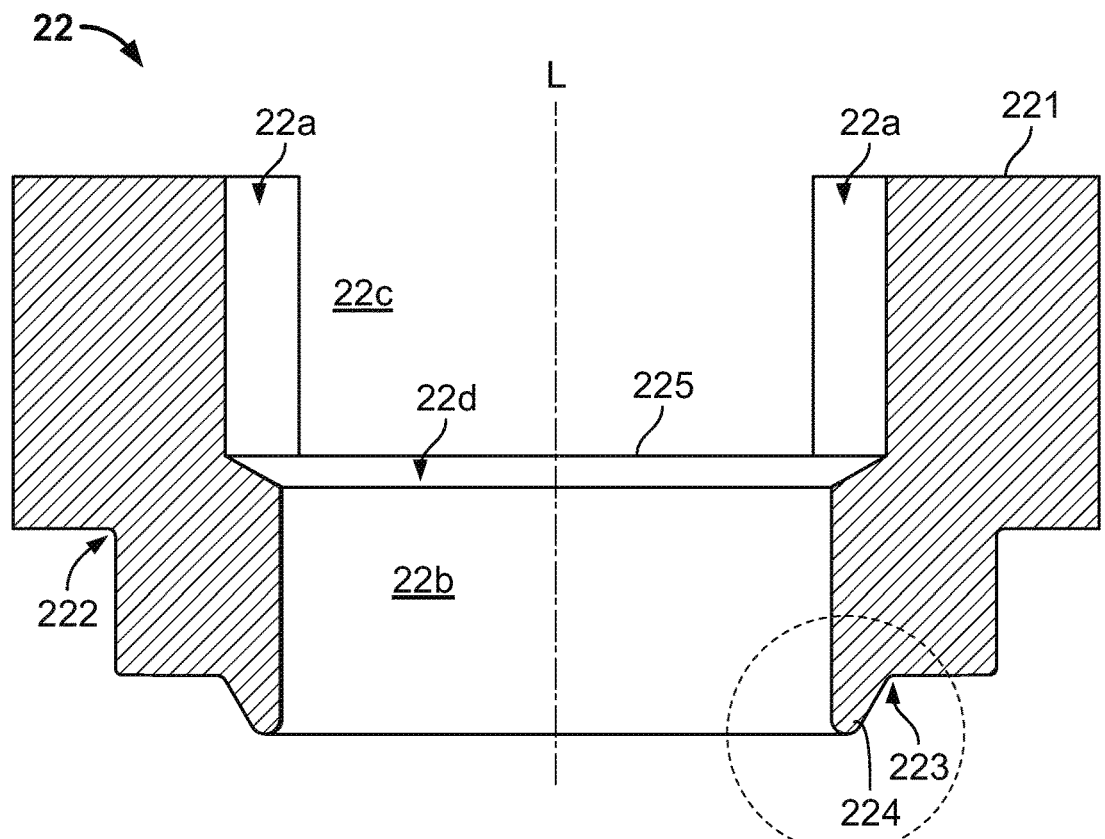
FIG. 19 is a cross-sectional view of the seat along section line F-F of FIG. 18.
Figure 20:
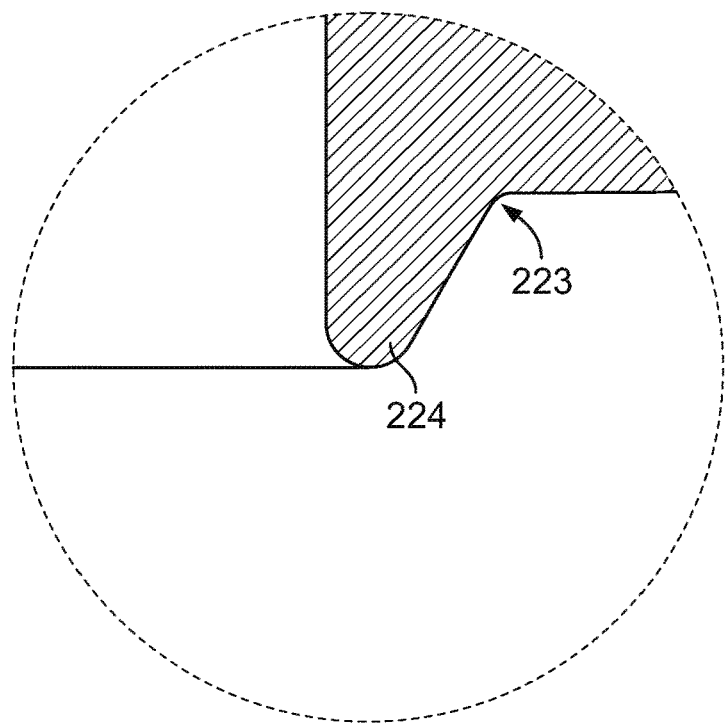
FIG. 20 is a partial enlargement of the cross-sectional view of the seat of FIG. 19.

With reference to FIGS. 18-20, the seat 22 defines voids 22a, 22b, 22c, and 22d. Voids 22a and 22b are cylindrical and have respective central axes collinear with the longitudinal axis L. Void 22a has a greater diameter than void 22b. Void 22d is conical and transitionally connects voids 22a and 22b. Voids 22a and 22b accommodate a portion of the pin 20. Void 22c is channel-shaped, is substantially perpendicular with the longitudinal axis L, and links to void 13f. The seat 22 includes a first upper surface 221, a first shoulder 222 for engaging the washer 23, a second shoulder 223, and a second upper surface 225. The second upper surface 225 is disposed below the first upper surface to define the channel-shaped void 22c. The second shoulder 223 includes the ring-shaped valve seat 224 for bearing against the second seat disc 26. The valve seat 224 narrows as it extends in the downward direction, such that the outer diameter of the valve seat 224 shrinks while the inner diameter of the valve seat 224 remains constant.

Figure 21:
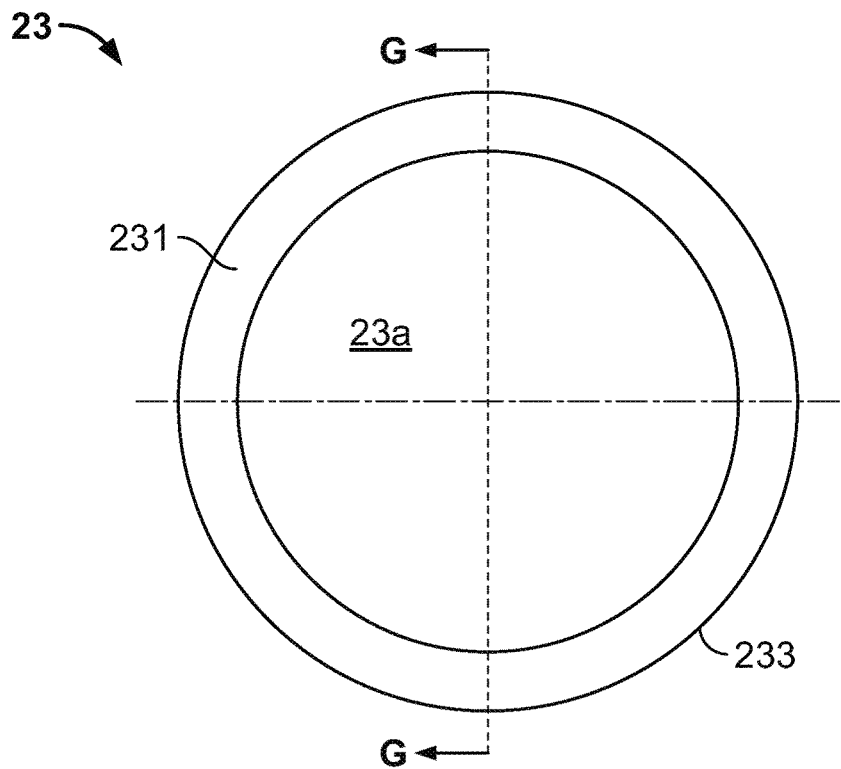
FIG. 21. is a top view of a washer of the spindle unit.
Figure 22:
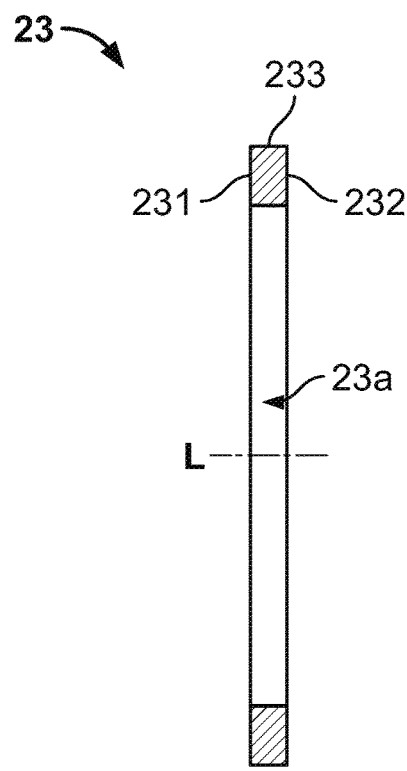
FIG. 22. is a cross-sectional view of the washer along section line G-G of FIG. 21.

With reference to FIGS. 21-22, the washer 23 includes an upper surface 231, a bottom surface 232, and an outer perimeter 233. The washer 23 defines void 23a. Void 23a is cylindrical, has a central axis collinear with the longitudinal axis L, and accommodates a portion of the pin 20. The upper surface 231 engages the first shoulder 222 of the seat 22. The bottom surface 232 engages the body 13.

Figure 23:
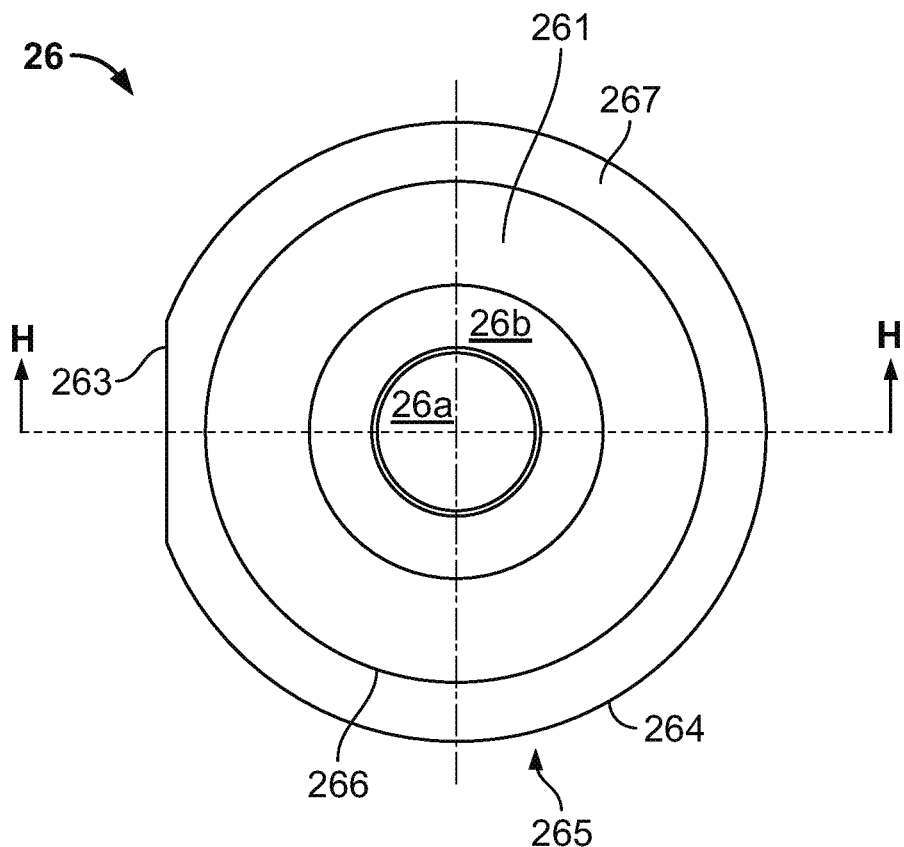
FIG. 23 is a top view of a second seat disc of the spindle unit.
Figure 24:
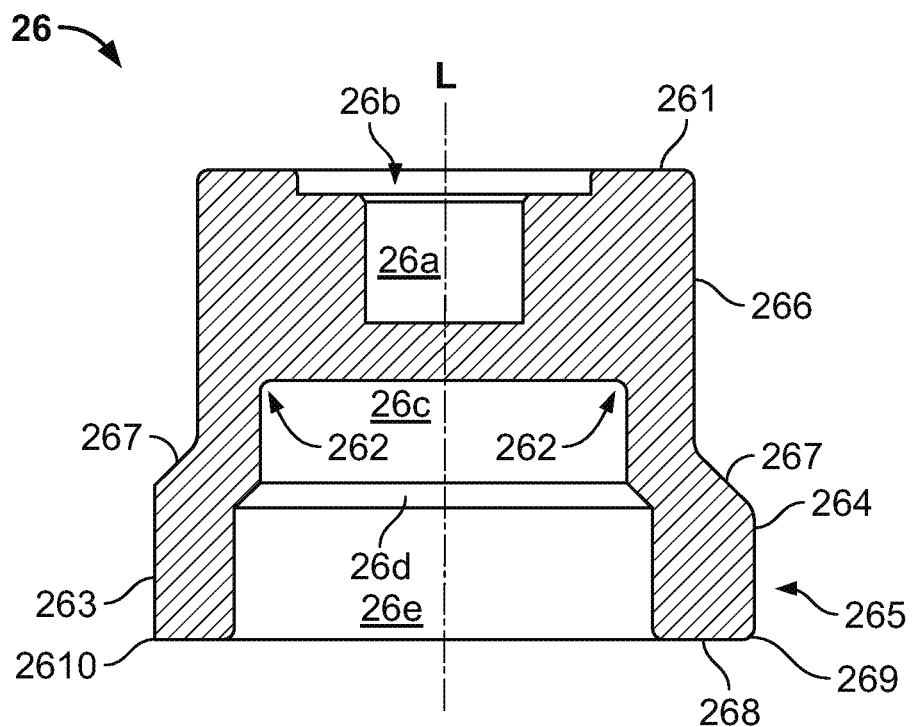
FIG. 24 is a cross-sectional view of the second seat disc along section line H-H of FIG. 23.

With reference to FIGS. 23-24, the second seat disc 26 defines voids 26a, 26b, 26c, 26d, and 26e. Voids 26a, 26b, 26c, 26d, and 26e respectively have central axes collinear with the longitudinal axis L. Void 26d is conical. Voids 26a, 26b, 26c, and 26e are cylindrical. Void 26a has a smaller diameter than void 26b. Void 26b receives the guiding portion 202b of the pin 20. Void 26a receives the engaging portion 202c of the pin 20. The second seat disc 26 includes a first upper surface 261 configured to compressively seal against the seat screw 22, a shoulder 262 configured to receive and inwardly bear against the second spring 27, and a first outer perimeter 265 including a flat surface 263 and a round portion 264. The flat surface 263 provides clearance for the second seat disc 26 in void 13e. The second seat disc 26 also includes a second outer perimeter 266, a transitional surface 267, and a bottom surface 268. The round portion 264 has a diameter greater than the second outer perimeter 266. The transitional surface 267 is conical to transition between the second outer perimeter 266 and the first outer perimeter 265. A rounded edge 269 is formed between the round portion 264 and the bottom surface 268. A square edge 2610 is formed between the flat surface 263 and the bottom surface 268.

Figure 25:
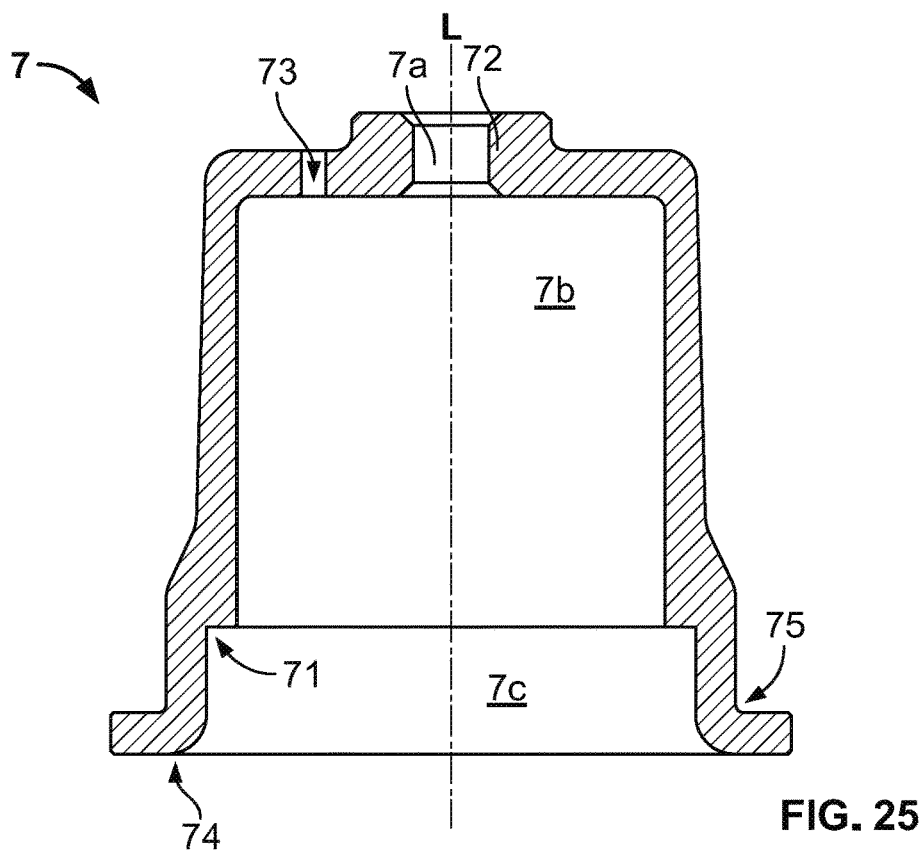
FIG. 25 is a cross-sectional view of a bonnet of the valve.

As shown in FIG. 25, the bonnet 7 defines voids 7a, 7b, and 7c. Voids 7a, 7b, and 7c are cylindrical and have central axes collinear with longitudinal axis L. The diameter of void 7a is smaller than the diameter of void 7b. The diameter of void 7b is smaller than the diameter of void 7c. The bonnet 7 includes the first shoulder 71, a second shoulder 74, and a third shoulder 75. The diaphragm 28 engages with the second shoulder 74. The bonnet screw 9 engages with the third shoulder 75. The bonnet 7 includes internal threads 72, which define void 7a, and a vent hole 73. Void 7c accommodates the diaphragm plate 10. Void 7b accommodates the first spring 8 and the spring support 6.

Figure 26:
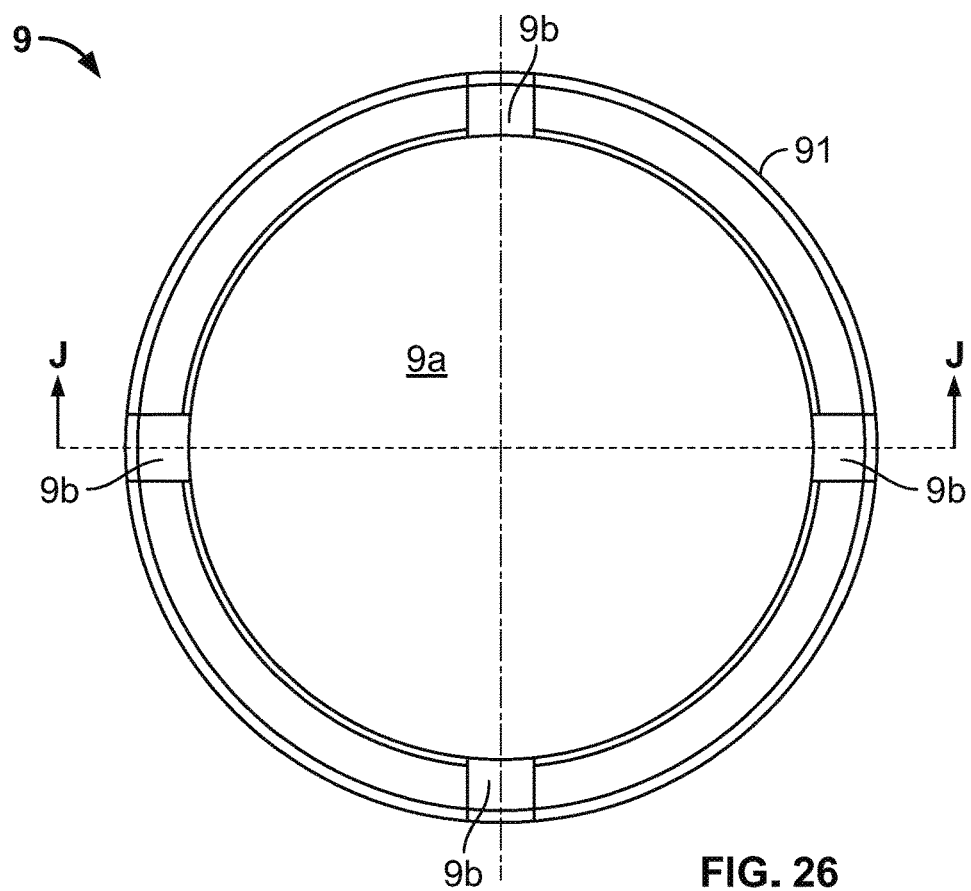
FIG. 26 is a top view of a bonnet screw of the valve.
Figure 27:
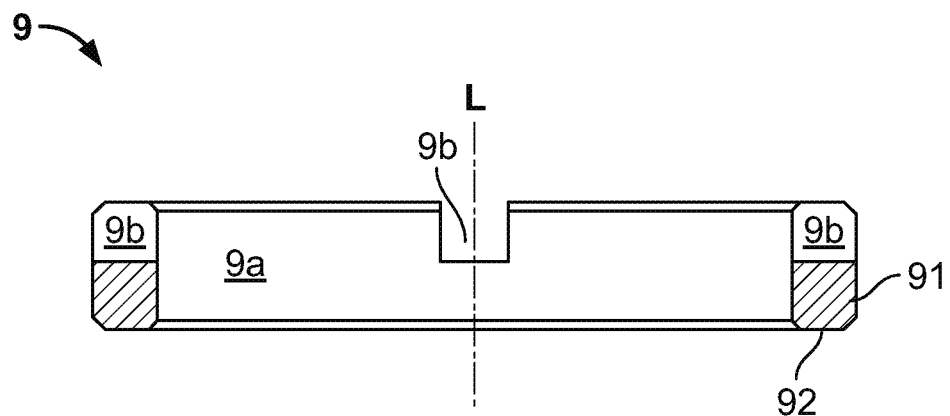
FIG. 27 is a cross-sectional view of the bonnet screw along section line J-J of FIG. 26.

With reference to FIGS. 26 and 27, the bonnet screw 9 is ring-shaped and defines an inner cylindrical void 9a with a central axis collinear with the longitudinal axis L. The bonnet screw 9 defines a plurality of rectangular slots 9b. A tool may be inserted into the slots 9b to enable a user standing above the bonnet 7 to torque the bonnet screw 9. Put differently, without slots 9b, a user would be unable to torque the bonnet screw 9 because outer walls of the body 13 surround the bonnet screw 9. The bonnet screw 9 includes outer threads 91 configured to engage inner threads of the body 13. The outer threads 91 may be continuous about an outer perimeter of the bonnet screw 9 or may be absent during intervals corresponding to slots 9b. The bonnet screw 9 further includes a bottom surface 92. The bottom surface 92 engages with the third shoulder 75 of the bonnet 7.

Figure 28:
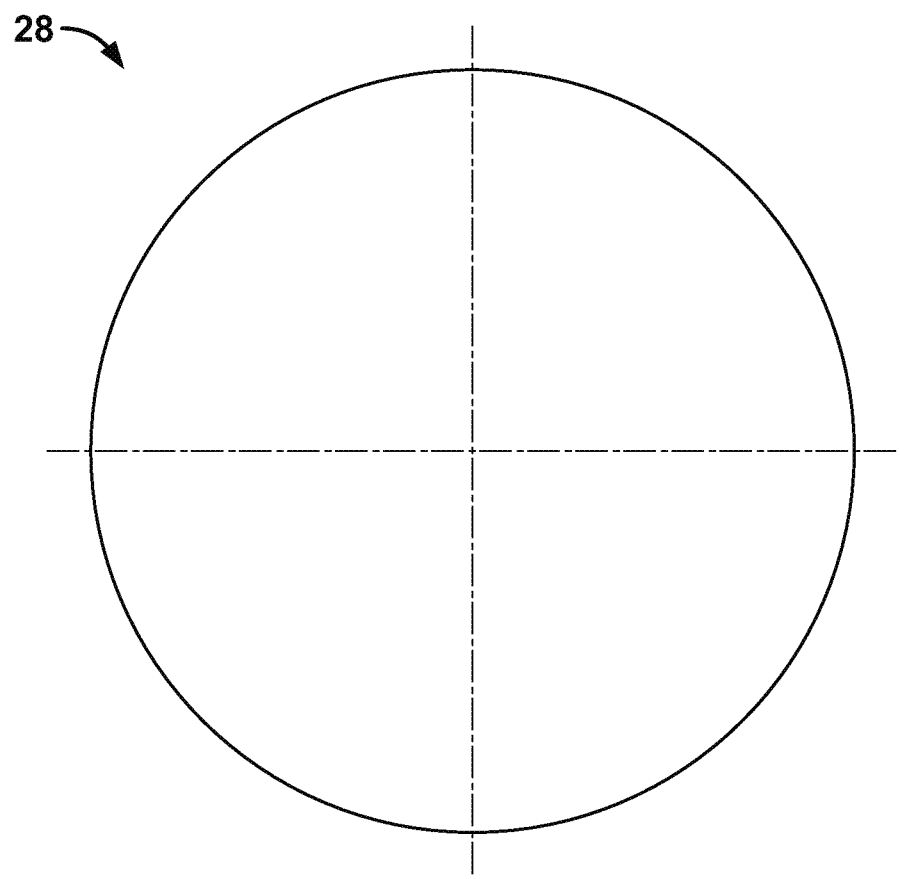
FIG. 28 top view of a diaphragm of the valve prior to deformation.
Figure 29:
FIG. 29 is a side view of the diaphragm prior to deformation.

FIGS. 28-29 show the diaphragm 28 prior to deformation and installation into the valve 1. Prior to deformation, the diaphragm 28 is a flat, circular, and continuous piece of metal. After deformation, and when the diaphragm 28 is in the neutral or flat position, as shown in FIGS. 3-4, a circular inner portion is elevated above a ring-shaped outer portion. The circular inner portion is configured to contact the first seat disc 17 and the diaphragm plate 10. The ring-shaped outer portion is configured to contact the o-ring 14. Upon deformation, the diaphragm 28 remains continuous and solid to substantially prevent fluid from leaking into the interface between the diaphragm plate 10 and the bonnet 7.

Figure 30:
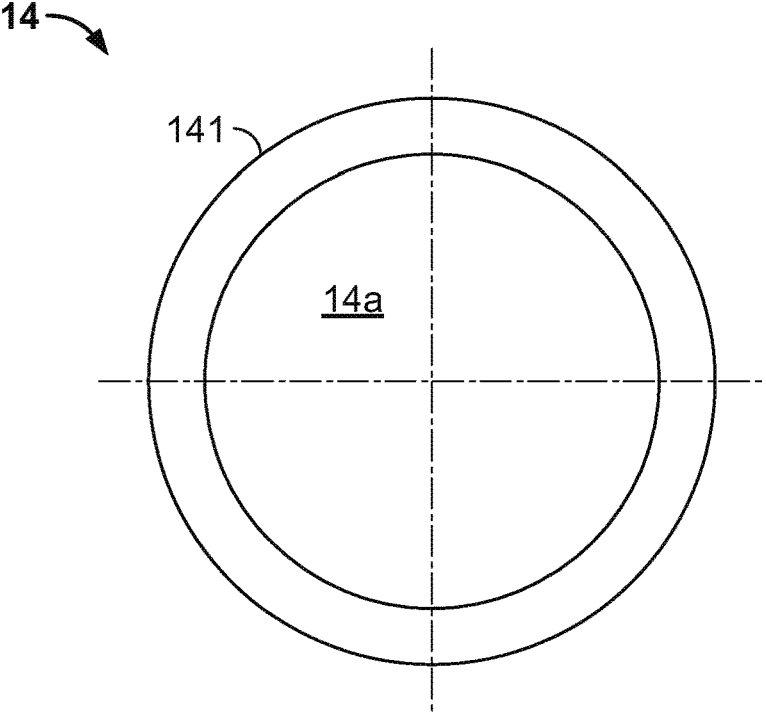
FIG. 30 is a top view of an o-ring of the valve.
Figure 31:
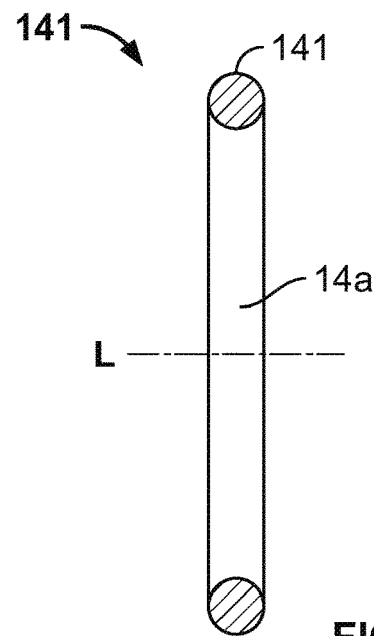
FIG. 31 is a cross-sectional view of the o-ring.

With reference to FIGS. 30-31, the o-ring 14 includes an outer perimeter 141 and defines void 14a. The o-ring 14 is substantially toroidal (e.g., doughnut-shaped). Void 14a has a central axis collinear with the longitudinal axis L. The o-ring 14 sealingly engages with the body 13 via void 13n and with the diaphragm 28.

Figure 32:
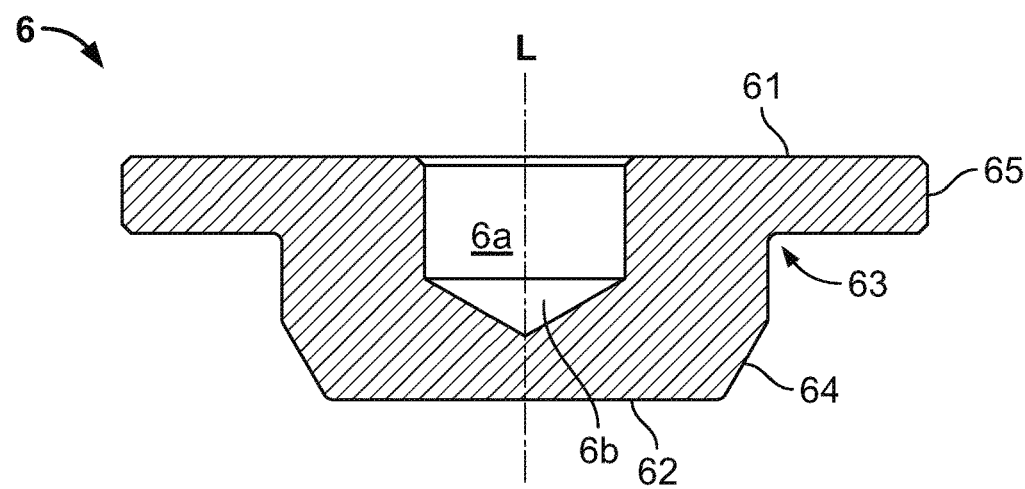
FIG. 32 is a cross sectional view of a spring support of the valve.

With reference to FIG. 32, the spring support 6 includes an upper surface 61, a bottom surface 62, a shoulder 63, a chamfer 64, and an outer perimeter 65 and defines voids 6a and 6b. Voids 6a and 6b have central axes collinear with the longitudinal axis L. Void 6a is cylindrical and partially conical. Void 6b is conical. Voids 6a and 6b accommodate the ball 5. The shoulder 63 transitions to the bottom surface via the chamfer 64. The shoulder 63 engages with the first spring 8. The shoulder 63 and the top surface 61 respectively transition to the outer perimeter 65 via rounded edges. The chamfer 64 may provide a lead-in to facilitate engaging the first spring 8 with the shoulder 63.

Figure 33:
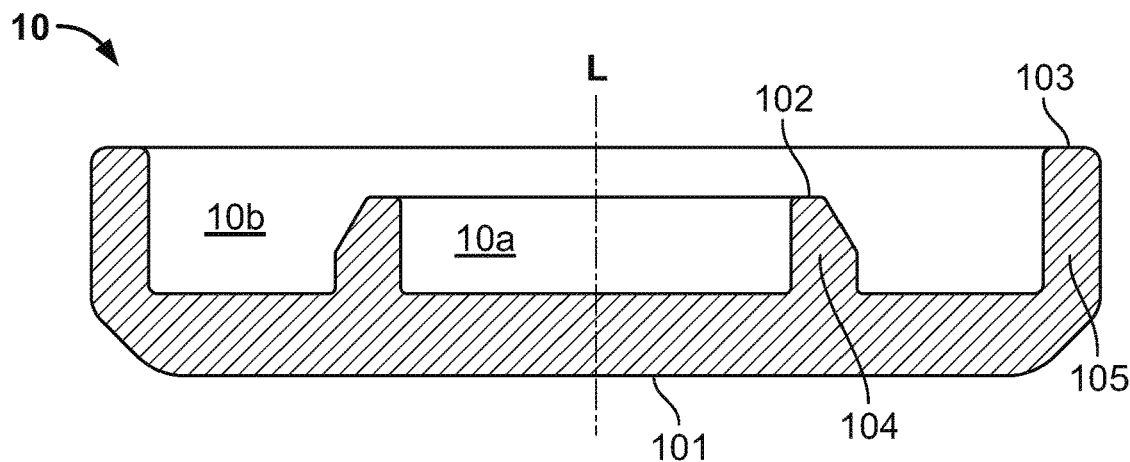
FIG. 33 is a cross sectional view of a diaphragm plate of the valve.
Figure 34:
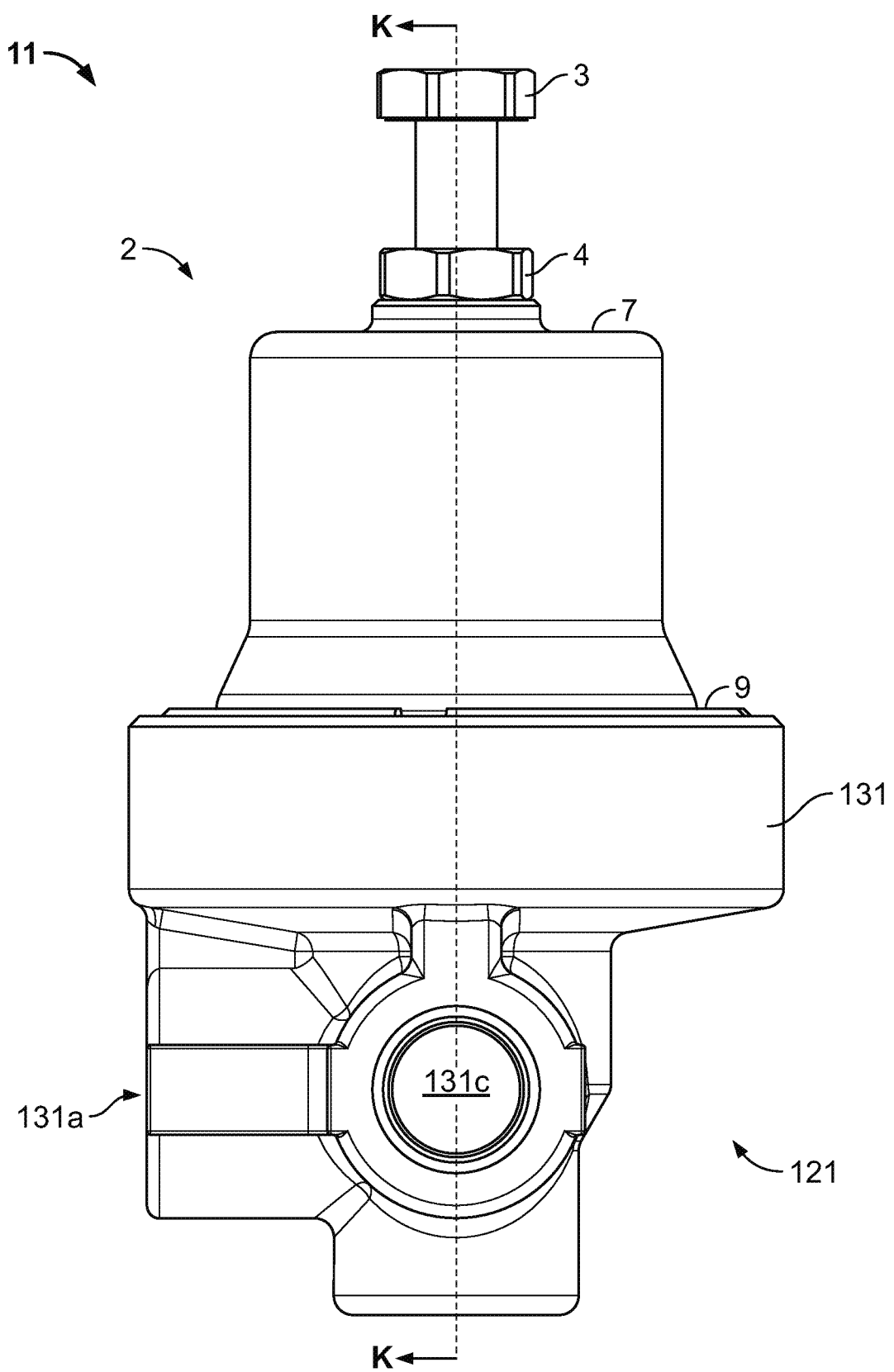
FIG. 34 is a side view of an alternative valve.
Figure 35:
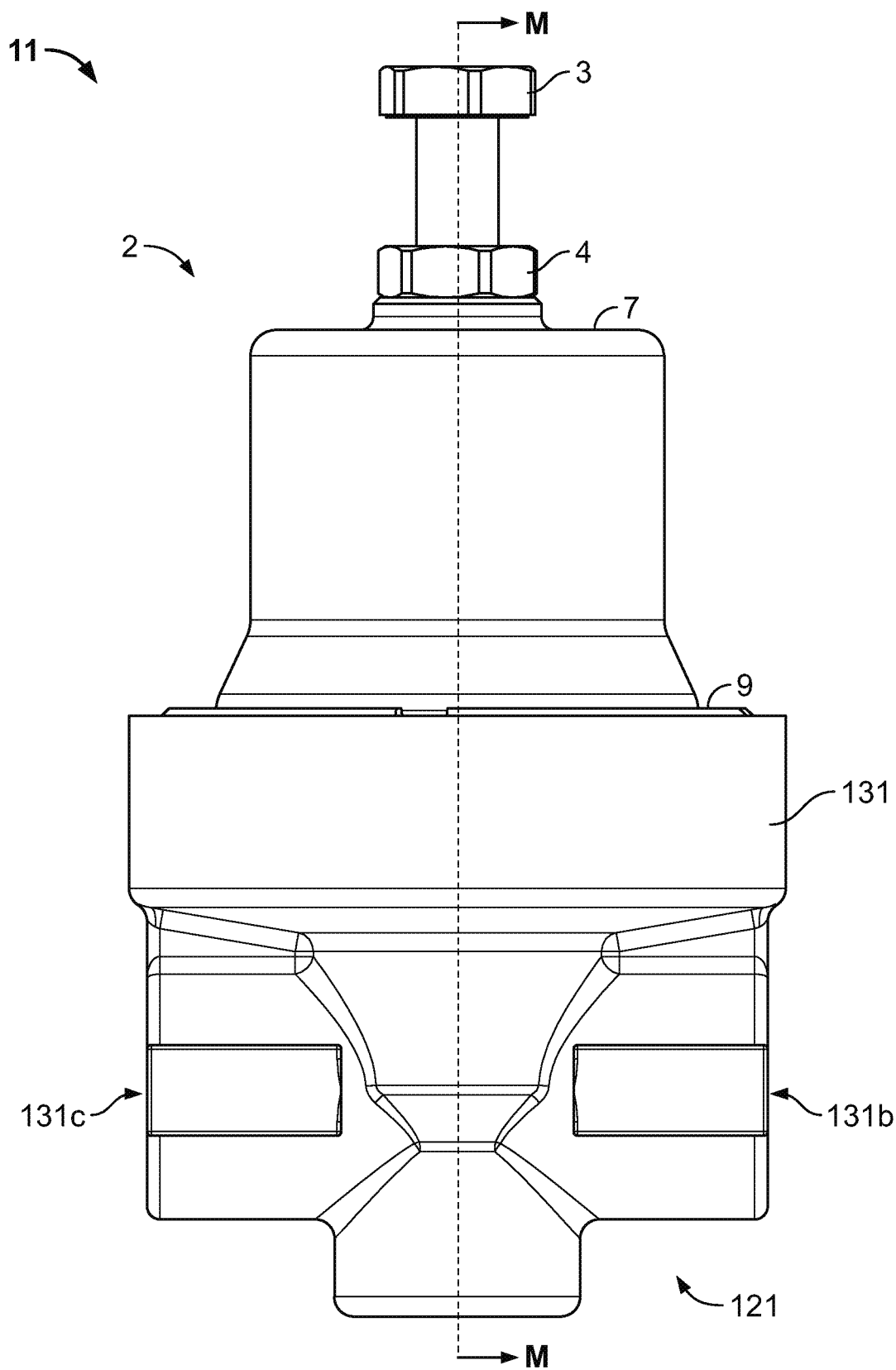
FIG. 35 is a front view of the alternative valve.

As shown in FIG. 33, the diaphragm plate 10 includes a lower surface 101, a first upper surface 102, a second upper surface 103, a first ring 104, and a second ring 105 and defines inner voids 10a and 10b. Inner void 10a is defined by the first ring 104, is cylindrical, and has a central axis collinear with the longitudinal axis L. Inner void 10b is defined by the first ring 104 and the second ring 105, has a central axis collinear with the longitudinal axis L, and is configured to receive the first spring 8. By virtue of first spring 8, the lower surface 101 engages with the diaphragm 28 substantially continuously (i.e., lower surface 101 contacts the diaphragm 28 in all of the neutral or flat, upwardly flexed, and downwardly flexed positions). The first lower surface 102 is disposed below to the second upper surface 103. The first ring 104 has a smaller diameter than the second ring 105. The spring 8 is thus captured between the first ring 104 and the second ring 105. The first ring 104 is chamfered to facilitate insertion of the first spring 8 into void 10b. The second upper surface 103 is configured to contact shoulder or step 71 of bonnet 7 to arrest upward flexing of diaphragm 28.

Figure 36:
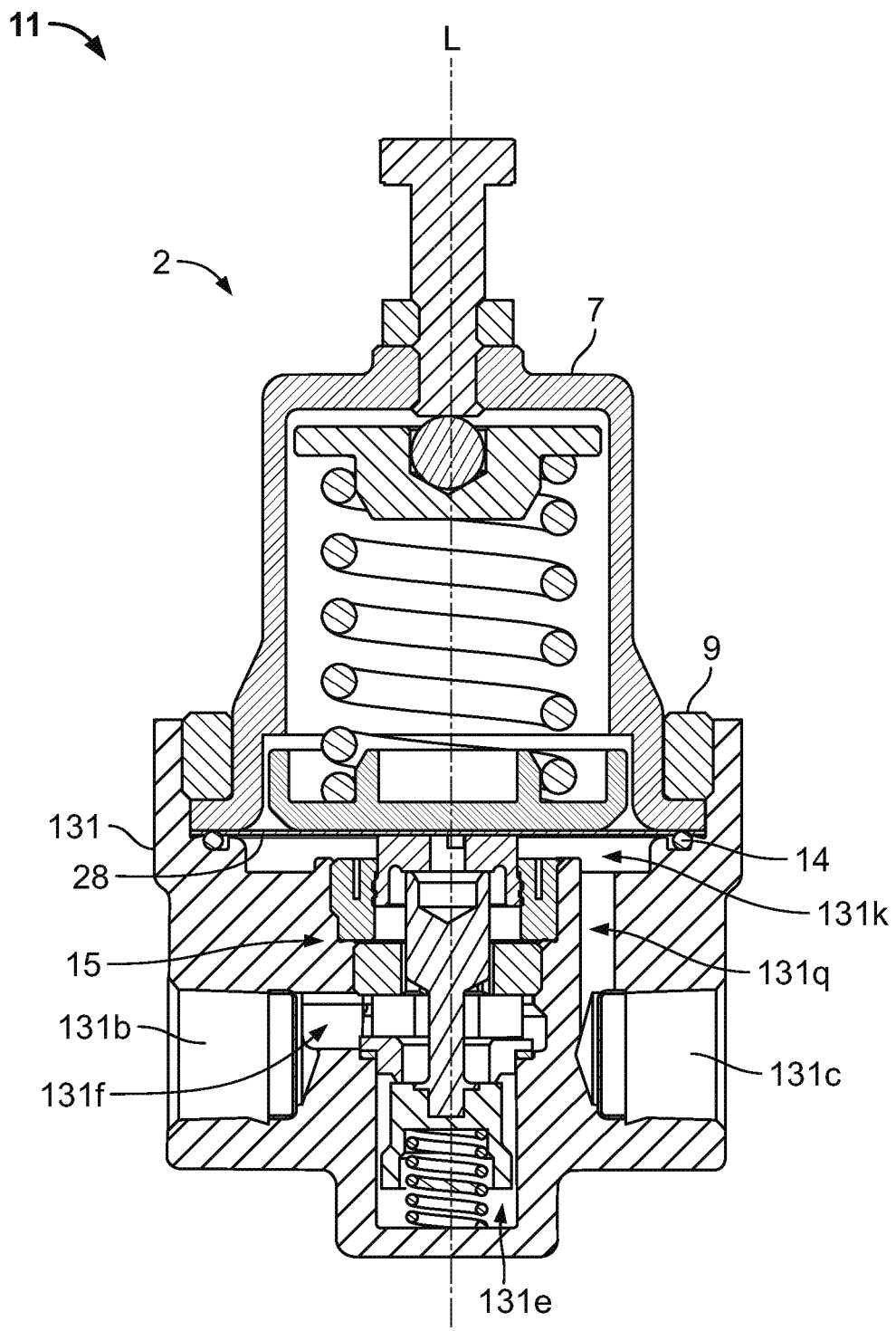
FIG. 36 is a cross-sectional view of the alternative valve along section line K-K of FIG. 34.
Figure 37:
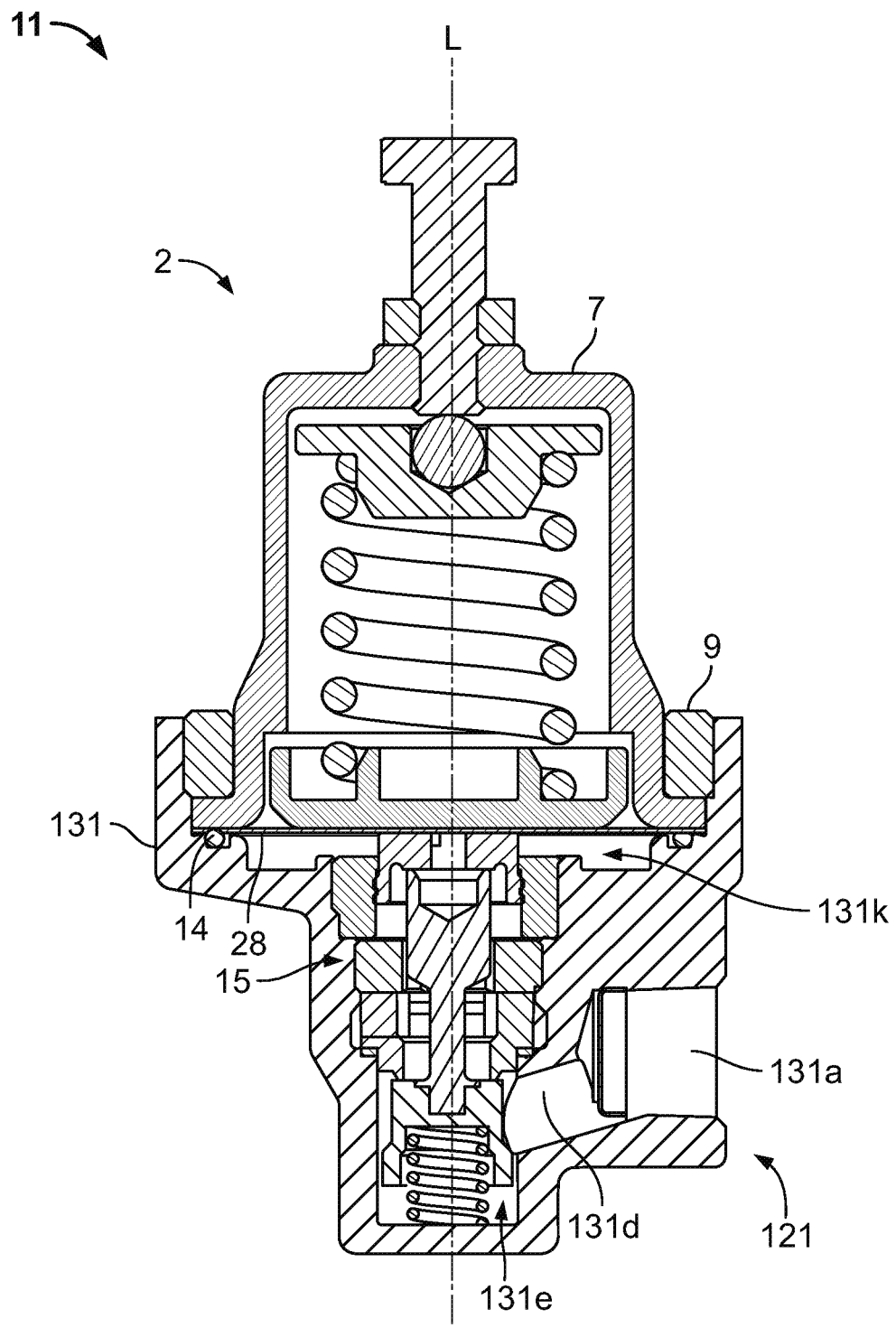
FIG. 37 is a cross-sectional view of the alternative valve along section line M-M of FIG. 35.

FIGS. 34 to 39 illustrate exemplary structural features of an alternative combination regulator valve 11. The alternative valve 11 is an alternative embodiment of the valve 1 of FIGS. 1-4. With reference to FIGS. 36-37, the alternative valve 11 has the longitudinal axis L and includes the setting portion 2 and its respective components of FIGS. 1-4, 25-27, and 32-33 as described above joined with an alternative flowing portion 121. The alternative valve 11 serves as a fluid economizer and as a fluid regulator. When serving as a fluid economizer, alternative valve 11 accepts fluid at a second port 131b and expels the fluid through a third port 131c. When serving as a fluid regulator, alternative valve 11 accepts fluid at a first port 131a and expels the fluid through the second port 131b.

The alternative flowing portion 121 is configured to (a) enable internal fluid communication between the first port 131a and the second port 131b, (b) enable internal fluid communication between the second port 131b and the third port 131c, and (c) disable internal fluid communication between the first, second and third ports 131a, 131b, 131c. With reference to FIGS. 34-37, the alternative flowing portion 121 includes an alternative body 131, the o-ring 14 of FIGS. 3-4 and 30-31, the spindle unit 15 and its respective components of FIGS. 3-5 and 11-24, and the diaphragm 28 of FIGS. 3-4 and 28-29.

With reference to FIGS. 34-37, the bonnet screw 9 compresses the bonnet 7 against the first and second outer portions of the diaphragm 28. The first outer portion of the diaphragm 28 is compressed between the o-ring 14 and the bonnet 7. The second outer portion is radially outward of the first outer portion and is compressed between the alternative body 131 and the bonnet 7. Thus, the diaphragm 28 discourages fluid leakage from void 131k and past the bonnet 7 at the first outer portion and at the second outer portion.

The guide 18 is threaded into the alternative body 131. The seat screw 21 is threaded into the alternative body 131 and axially bears on the seat 22 to capture the seat 22 in the alternative body 131. The washer 23 is compressed between the seat 22 and the alternative body 131 to discourage fluid from flowing between the alternative body 131 and the seat 22. The second seat disc 26 receives the second spring 27 to capture the second spring 27 between the second seat disc 26 and the alternative body 131 and to longitudinally align the second spring 27 with the longitudinal axis L. Further connections and interactions of the components of the spindle unit 15 are as described above.

As described above, the first spring 8 biases the diaphragm 28 downward. Fluid pressure in void 131*k* biases the diaphragm 28 upward. Additionally, fluid pressure in voids of the spindle unit 15 bias diaphragm 28 upward as described above. Similarly, fluid pressure in void 131*e* biases diaphragm 28 upward, but only until upward movement of the spindle unit 15 is stopped as described above.

These biases and fluid pressures apply force to the diaphragm 28 and thus determine whether the diaphragm 28 is upwardly flexed, downwardly flexed, or neutral. It should be appreciated that because void 131*k* has a greater area parallel to diaphragm 28 than the voids of the spindle unit 15, pressure in void 131*k* influences the position of diaphragm 28 to a greater extent than pressure in the spindle unit 15.

Upon installation, a user cannot access the spindle unit 15 or the diaphragm 28 without removing the bonnet 7. Thus, by rotating the screw 3, the user may control the fluid pressures in void 131*k* and in the spindle unit 15 that causes diaphragm 28 to flex upwardly and downwardly as described above with respect to voids 13*k* and 17*c*.

When the diaphragm 28 downwardly flexes, the spindle unit 15 is displaced to permit fluid communication between the first port 131*a* and the second port 131*b* via voids 131*d*, 131*e*, the spindle unit 15, and void 131*f*. When the spindle unit 15 is displaced downwardly, internal fluid communication is blocked between (a) the first and second ports 131*a*, 131*b* and (b) the third port 131*c* through the alternative flowing portion 121. Put differently, internal fluid communication only occurs between the first and second ports 131*a* and 131*b*.

When fluid pressure in void 131*k* flexes the diaphragm 28 upward past the neutral or flat position, the spindle unit 15 occupies the closed position shown in FIGS. 36-37 similar to the closed position of FIGS. 3-4.

Fluid pressure in void 131*k* spread across the surface area of the diaphragm 28 produces a first force. Fluid pressure in void 131*k* spread across the surface area of the topside of the first seat disc of the spindle unit 15 produces a second force, as described above. Fluid pressure in the spindle unit 15 produces a third force, as described above. When the first force overcomes the downward force of the setting portion 2, the diaphragm 28 flexes upwardly. When the third force overcomes the second force, the first seat disc disengages from the pin of the spindle unit 15 as described above. Similar to above, a first minimum fluid pressure in void 131*k* spread across the surface area of the diaphragm 28 overcomes the downward force of the setting portion 2 and a second minimum pressure in the spindle unit 15 spread across the a portion of the bottom surface area of the first seat disc overcomes the downward force of fluid pressure in void 131*k* spread across the top surface area of the spindle unit 15. Thus, fluid communication is enabled between the second port 131*b* and the third port 131*c* via voids 131*f*, and 131*q* and the spindle unit 15.

Similar to above, when the diaphragm 28 flexes upwardly, internal fluid communication is blocked between (a) the first port 131*a* and (b) the second and third ports 131*b*, 131*c*. Put differently, internal fluid communication only occurs between the second and third ports 131*b*, 131*c*.

When the diaphragm 28 is in the neutral or flat position, as shown in FIGS. 36-37, the diaphragm 28 counters the upward force of fluid pressure in the spindle unit 15 and the spindle unit 15 occupies the closed position, as described above. As a result, the alternative valve 11 blocks internal fluid communication between all of the first, second, and third ports 131*a*, 131*b*, 131*c*.

Figure 38:
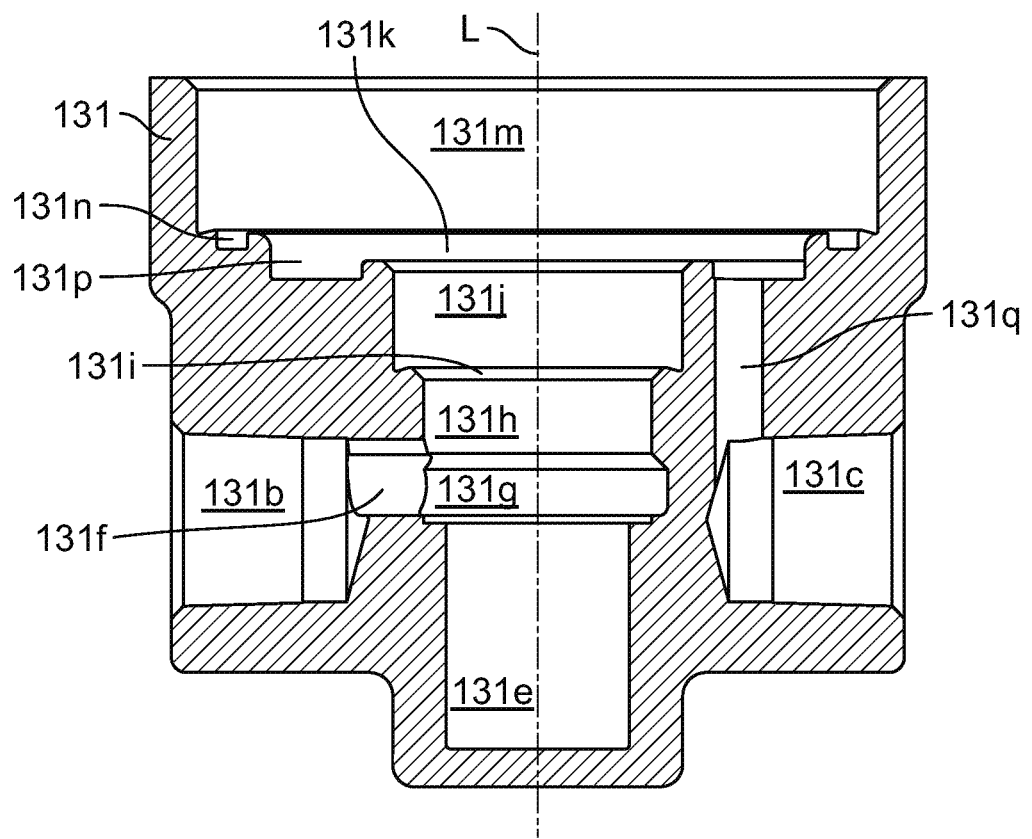
FIG. 38 is a cross-sectional view of a body of the alternative valve along section line K-K of FIG. 34.
Figure 39:
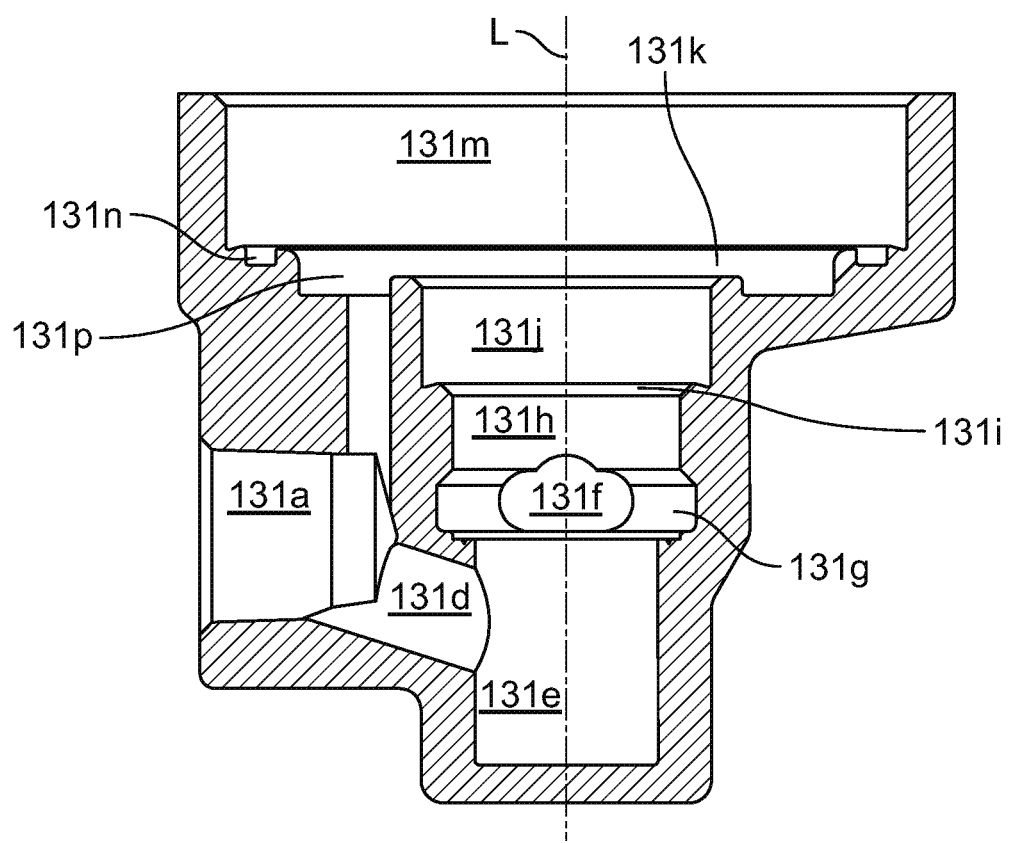
FIG. 39 is a cross-sectional view of the body of the alternative valve along section line M-M of FIG. 35.

As shown in FIGS. 38-39, the alternative body 131 defines (a) first, second, and third ports 131*a*, 131*b*, 131*c* and (b) voids 131*d*, 131*e*, 131*f*, 131*g*, 131*h*, 131*i*, 131*j*, 131*k*, 131*m*, 131*n*, 131*p*, and 131*q*. For the reader's convenience and to avoid confusion, the void numbering skips 131*l* and 131*o*.

The first, second, and third ports 131*a*, 131*b*, 131*c* are partially conical and transversely extending in the body 131. The second and third ports 131*b*, 131*c* are opposite one another with collinear central axes. The first port 131*a* has a central axis perpendicular to the central axes of the second and third ports 131*b*, 131*c*.

Void 131*d* is cylindrical with a central axis angled with respect to the longitudinal axis L and the central axis of the first port 131*a*. Void 131*e* is cylindrical and linked to void 131*a* via void 131*d*. Void 131*e* has a central axis parallel to and collinear with the longitudinal axis L. Void 131*e* accommodates the spindle unit 15 in the same manner as void 13*e*, described above. Void 131*f*, has a central axis perpendicular to the longitudinal axis L, has three lobes, and links the second port 131*b* with voids of the spindle unit 15 in the same manner as void 13*f*, described above.

Void 131*g* is disc shaped and accommodates the spindle unit 15 in the same manner as void 13*g*, described above. A central axis of void 131*g* is collinear with the longitudinal axis L. Void 131*g* has a maximum diameter exceeding the maximum diameters of voids 131*e* and 131*h*.

Void 131*h* is cylindrical. Inner surfaces of the alternative body 131 defining void 131*h* are threaded to threadably engage with the spindle unit 15. A central axis of void 131*h* is parallel to the longitudinal axis L. Void 131*h* accommodates the spindle unit 15 in the same manner as void 13*h*, described above. Void 131*i* is a conical transition between voids 131*h* and 131*j*. Void 131*i* has a larger major diameter than the non-threaded portion of void 131*h* and a central axis collinear with longitudinal axis L.

Void 131*j* is cylindrical. Inner surfaces of the alternative body 131 defining void 131*j* are threaded to threadably engage with the spindle unit 15. A central axis of void 131*j* is parallel to the longitudinal axis L. Void 131*j* accommodates the spindle unit 15 in the same manner as void 13*j*, described above. Void 131*k* is cylindrical with a central axis collinear with the longitudinal axis L. Void 131*k* has a greater diameter than any of voids 131*e*, 131*g*, 131*h*, 131*i*, and 131*j*. Void 131*k* accommodates the spindle unit 15 in the same manner as void 13*k*, described above. When downwardly flexed, the diaphragm 28 protrudes into void 13*k*.

Void 131*m* is cylindrical with a central axis collinear with the longitudinal axis L. A portion of the inner surfaces of the alternative body 131 defining void 131*m* are threaded to threadably engage with the bonnet screw 9. A portion of the inner surfaces defining void 131*m* are not threaded to enable the bonnet 7 to outwardly bear against the alternative body 131. Void 131*m* accommodates the diaphragm 28 when in the neutral or upwardly flexed positions and the spindle unit 15 in the same manner as void 13*m*, described above.

Void 131*n* is ring-shaped with a central axis collinear with the longitudinal axis L. Void 131*n* accommodates the o-ring 14. Void 131*p* is ring-shaped, lies below void 131*k*, and has a central axis collinear with the longitudinal axis L. Void 131*q* has a central axis offset from, but parallel with the longitudinal axis L and connects the third port 13*c* with void 131*k* via void 131*p*.

Several advantages are offered by the valve and the alternative valve. First, the valve 1 and the alternative valve 11 separate the regulator function from the economizer function by applying two different independently moveable seat discs 17, 26. The inclusion of independently moveable seat discs reduces the chances of unintended fluid communication between all three ports 13a, 13b, 13c in the valve 1 or between all three ports 131a, 131b, 131c when only fluid communication between two of the ports is desired.

Second, bonnet 7 and body 13 confine spindle unit 15 within valve 1 and within the alternative valve 11. This confinement reduces the possibility of external leakage through the valve 1 or through the alternative valve 11 and reduces the chances of damage to spindle unit 15.

Third, by applying the bonnet screw 9 to lock the bonnet 7 with respect to the body 13 or to the alternative body 131, the chances of damage to the diaphragm 28 are reduced. Put differently, the bonnet screw 9 enables a user to stably and reliably compress diaphragm 28 between the bonnet 7 and the body 13 or the alternative body 131. In at least some prior art designs, a bonnet is directly threaded to a body, which increases the chances of damaging a diaphragm, compressed between the bonnet and the body, during assembly. This is because the absence of a bonnet screw prevents a user from reliably controlling the compression between the body and the bonnet.

Fourth, the valve 1 and the alternative valve 11 enable a user to replace internal components in a single direction. More specifically, after disengaging the bonnet screw 9 and removing the bonnet 7, a user can access and remove all of the spindle unit 15 when looking down at the body 13 or the body 131.

Fifth, the valve 1 and the alternative valve 131 generate a metal-to-metal seal between diaphragm 28 and the body 13 or the alternative body 131, respectively, along the outer circumference of the diaphragm 28. The bonnet 7 compresses the diaphragm 28 against the body 13 or the alternative body 131 to ensure the integrity of the seal. Besides generating a tight seal, this compression ensures that the diaphragm 28 does not move horizontally or laterally (i.e., perpendicular to longitudinal axis L) during operation.

Sixth, the o-ring 14 provides an additional seal that discourages fluid from leaking past the diaphragm 28 and between the bonnet 7 and the body 13 or the alternative body 131. Additionally, the o-ring 14, by acting as a spring, absorbs some downward force applied to the diaphragm 28. As a result, the o-ring 14 reduces the chances that downward force generated by the bonnet screw 9 and applied by the bonnet 7 will crack the diaphragm 28. Furthermore, the presence of the o-ring 14 enables the diaphragm 28 to flex to a greater extent than at least some prior art diaphragms. More specifically, because the o-ring 14 acts as a spring to absorb forces applied against the diaphragm 28, the diaphragm 28 can tolerate the greater forces associated with more extreme flexing positions.

Seventh, because the seat screw 22 is separate from body 13 and from the alternative body 131, a user can machine the sealing surface (valve seat 224) against which second seat disc 26 seals prior to assembly. In at least some prior art designs, valve seats are formed on inner surfaces of a body. As a result, it is difficult to access and thus accurately machine these prior art valve seats. When those inner surfaces are downwardly facing, a bottom portion of the body may be threadably detachable from a top portion of the body to enable tool access to the downwardly facing inner surfaces. Because the seat screw 22 is removable, the body 13 and the alternative body 131 can be integrally formed.

Additionally, a user may periodically replace the seat screw 22 without replacing the body 13 or the alternative body 131. When valve seats are formed on inner surfaces of a body, these valve seats cannot be replaced without replacing the entire body.

Eighth, the first seat disc 17 is confined between the diaphragm 28 and the pin 20. As a result, the first seat disc 17 does not need to be attached to the diaphragm 28. In at least some prior art designs, a seat disc is attached to a diaphragm, necessitating a hole in the diaphragm for receiving the seat disc. Consequently, the present disclosure enables the diaphragm 28 to be a solid piece of material, which reduces the chances of leakage through the diaphragm 28.

Ninth, the first seat disc 17 is an upside-down bowl design (i.e., bowl-shaped), which discourages contaminants from resting between the pin 20 and the inner surface 173 of the first seat disc 17. Furthermore, the top of the first seat disc 17 includes an upper surface 171 and a lower surface 172. Contaminants resting between the diaphragm 28 and the first seat disc 17 will thus be biased from the upper surface 171 toward the lower surface 172 due to the contact between the upper surface 171 and the diaphragm 28.

This list of advantages is not exhaustive. Additional advantages of the invention are apparent with reference to other sections of the specification and the figures.

The o-rings 14 and the washer 23 may be a compressible polymer such as PTFE or Omni-seal. The diaphragm 28, the body 13, and the alternative body 131 may be metals. The first and second seat discs 17, 26 may be a compressible material such as PTFE to discourage the first seat disc 17 from damaging the diaphragm 28 and to discourage the second seat disc 26 from damaging the seat 22. The remaining components of the valve 1 and the alternative valve 11 may be metal.

Figure 40:
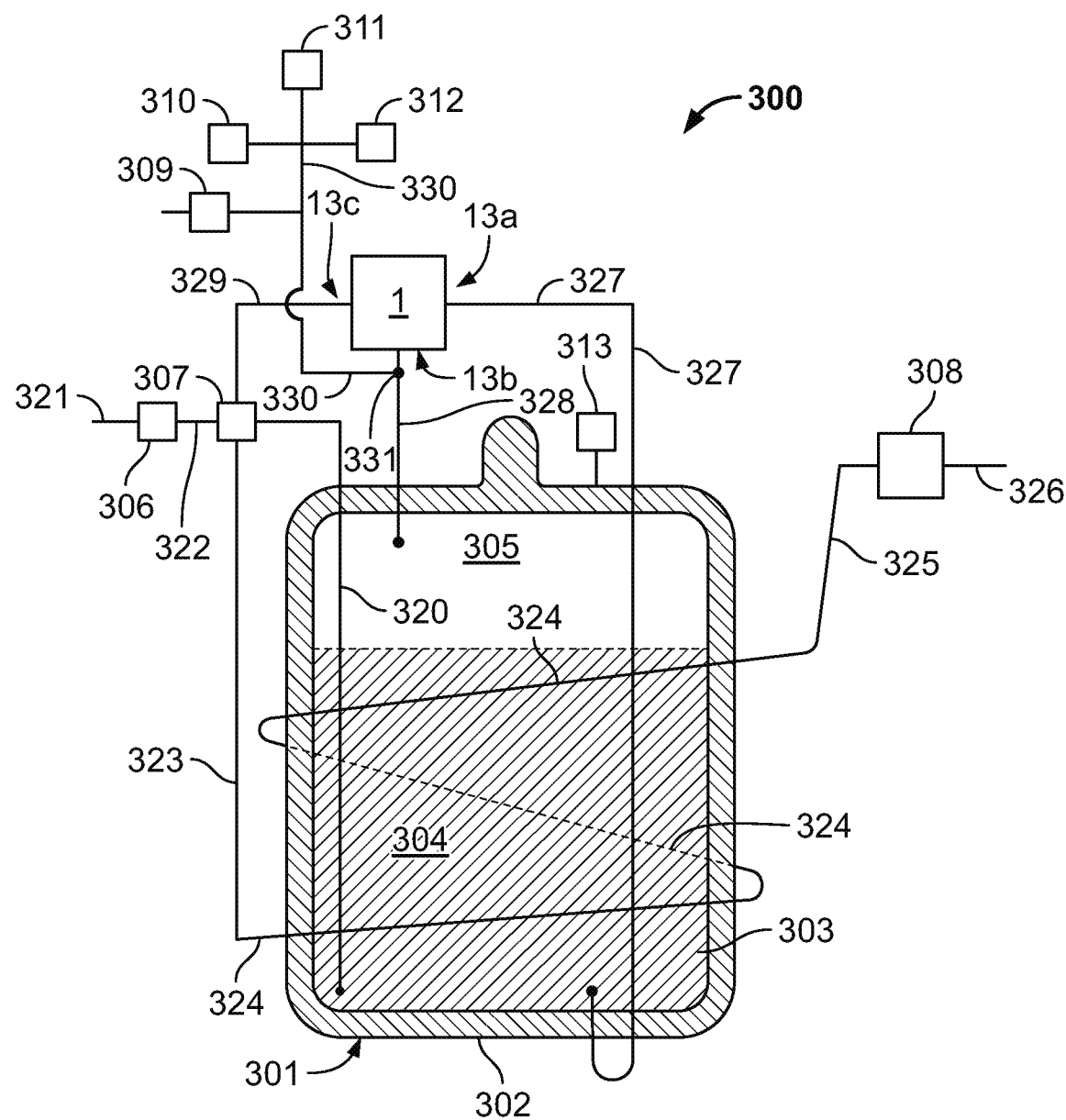
FIG. 40 is a schematic diagram of a cryogenic system integrating the valve.

FIG. 40 schematically illustrates a cryogenic system 300 for receiving, storing, and dispensing cryogenic fluid (e.g., natural gas, oxygen, etc.). Cryogenic system 300 includes the valve 1, a tank 301 (which includes an inner tank 303 and an outer tank 302), liquid phase fluid 304, gas phase fluid 305, a first two-way valve 306, a second two-way valve 308, a four-way junction or valve 307, a two-way vent valve 309, an inner tank rupture disk 310, a pressure gauge 311, a safety relief valve 312, an outer tank rupture disc 313, lines 320 to 330, and a three-way junction 331. It should be understood that, in another embodiment, the alternative valve 11 may also be used in the cryogenic system 300 in place of the valve 1.

The tank 301 includes a protective outer tank 302 and an inner tank 303 for storing the fluid. Fluid inside the inner tank 303 naturally separates into liquid fluid 304 and a gas fluid 305. Lines 328 and 330 fluidly communicate at the three-way junction 331. Although lines 330 and 329 cross, lines 330 and 329 are distinct and not in fluid communication, as indicated by the jumpover in FIG. 40. Line 320 extends to a lower portion of the tank 301 to communicate with liquid fluid 304. Line 328 extends to an upper portion of the tank 301 to communicate with gas fluid 305. Line 327 is a pressure building coil and accepts liquid fluid 304 from a bottom of the tank 301. Line 324 is a vaporizer. Line 327 connects to the first port 13a. Line 328 connects to the second port 13b. Line 329 connects to the third port 13c. Junction or four-way valve 307 is configured to fluidly communicate lines 322, 323, 320, and 329. Junction or four-way valve 307 may enable a user to selectively isolate some or all of lines 322, 323, 320, and 329 from junction or four-way valve 307.

A user may fill the tank 301 by connecting a source of cryogenic fluid to line 321 and opening the first two-way valve 306. A user may withdraw liquid fluid through line 321 after opening the first two-way valve 306. A user may withdraw gas fluid through line 326 after opening the second two-way valve 308.

As described above, the valve 1 is configured to (a) enable internal fluid communication between the first port 13a and the second port 13b, (b) enable internal fluid communication between the second port 13b and the third port 13c, and (c) disable internal fluid communication between the first, second, and third ports 13a, 13b, and 13c. As described above, the valve 1 is configured to perform these functions based on fluid pressure in voids 13k, 17c, and 13e. Fluid from the tank 301 enters void 13k via line 320, the four-way valve 307, line 329, and the third port 13c. Fluid from the tank 301 enters void 17c via line 328 and the second port 13b. Fluid from the tank 301 enters void 13e via line 327 and the first port 13a.

The valve 1 is configured to enable internal fluid communication between the first port 13a and the second port 13b when pressure of fluid in the tank 301 is below a first predetermined pressure. Due to the low pressure, and as previously discussed, the diaphragm 28 occupies the downwardly flexed position. As a result, the second seat disc 26 is disengaged from the seat 22, and the first seat disc 17 is engaged with the pin 20. Therefore, fluid communication through the valve 1 between the first port 13a and the second port 13b is enabled while fluid communication through the valve 1 between (a) the first and second ports 13a and 13b and (b) the third port 13c is disabled. When fluid communication between the first and second ports 13a and 13b is enabled, liquid fluid enters line 327 (the pressure building coil), which vaporizes the liquid fluid into a gas fluid. The gas fluid enters the first port 13a, flows through the second port 13b, and reenters the tank 301 as a gas. As a result, pressure in the tank 301 increases.

The valve 1 is configured to enable internal fluid communication between the second port 13b and the third port 13c when pressure in the tank 301 is above a second predetermined pressure. The second predetermined pressure is greater than the first predetermined pressure. Due to the higher pressure, as previously discussed, the diaphragm 28 occupies the upwardly flexed position. As a result, the second seat disc 26 is engaged with the seat 22. When a user opens the first two-way valve 306 and/or the second two-way valve 308, which are in fluid communication with the third port 13c, fluid pressure in void 13k decreases suddenly while fluid pressure in void 17c substantially remains at the higher pressure. Thus, a pressure differential is formed between voids 13k and 17c. Due to the pressure differential, the first seat disc 17 is disengaged from pin 20. Therefore, fluid communication through the valve 1 between the second port 13b and the third port 13c is enabled while fluid communication through the valve 1 between (a) the second and third ports 13b and 13c and (b) the first port 13a is disabled.

When fluid communication between the second and third ports 13b and 13c is enabled and a user has opened two-way valve 308, fluid flows from line 328, through valve 1, into line 329, through the junction or four-way valve 307, through line 323, and into the vaporizer 324. The vaporizer 324 converts any remaining liquid fluid into gas fluid and delivers the gas fluid to the two-way valve 308. Fluid is dispensed to a consumer (e.g., an engine) via line 326.

The valve 1 is configured to disable internal fluid communication between the first, second, and third ports 13a, 13b, and 13c when fluid pressure in the tank 301 is between the first predetermined pressure and the second predetermined pressure. Upon opening the two-way valve 308, fluid flows from line 320, through the valve 307, through line 323, into the vaporizer 324 (where liquid fluid is converted to gas fluid), through the second two-way valve 308, and out of line 326. Upon opening the first two-way valve 306, fluid flows through line 320, through the four-way valve 307, through line 322, through the first two-way valve 306, and out through line 321. It should thus be appreciated that fluid delivered through the two-way valve 306 includes more liquid phase fluid than fluid delivered through the second two-way valve 308.

What is claimed is:

1. A valve for conveying fluid, the valve comprising:
   a bonnet secured to a body;
   a flexible diaphragm compressed between the bonnet and the body;
   a first spring disposed in the bonnet; and
   a spindle unit disposed in the body and comprising:
      a pin;
      a first seat disc, disposed between the pin and the diaphragm, the first seat disc and the pin defining a first void, the first spring biasing the diaphragm toward the first seat disc; and
      a seat screw engaged with the body and slidably engaged with the pin, wherein an inner surface of the seat screw and a surface of the pin define a fluid passage in fluid communication with the first void.

2. The valve of claim 1, wherein the body defines a first port, a second port, and a third port; and
   wherein the valve is configured to have (a) a first position where the first port and the second port are in internal fluid communication and neither the first port nor the second port are in internal fluid communication with the third port, (b) a second position where the second port and the third port are in internal fluid communication and neither the second port nor the third port are in internal fluid communication with the first port, and (c) a third position where none of the first port, the second port, and the third port are in internal fluid communication.

3. The valve of claim 2, further comprising a bonnet screw engaged to the body to secure the bonnet to the body.

4. The valve of claim 3, further comprising an o-ring compressed between the diaphragm and the body, wherein the bonnet screw is disposed above the o-ring such that downward force applied by the bonnet screw to the bonnet is at least partially transmitted to the o-ring via the diaphragm.

5. The valve of claim 4, wherein the bonnet screw is disposed in an outer circumferential shoulder of the bonnet.

6. The valve of claim 1, further comprising an o-ring compressed between the diaphragm and the body.

7. The valve of claim 6, wherein the body defines a ring-shaped second void and the o-ring is disposed inside the ring-shaped second void.

8. The valve of claim 7, wherein the body comprises an edge that protrudes into the o-ring.

9. The valve of claim 1, wherein the first seat disc is bowl-shaped with an inner surface facing toward the pin and an outer surface facing toward the diaphragm.

10. The valve of claim 1, wherein the spindle unit comprises a seat engaged with the body and slidably engaged with the pin.

11. The valve of claim 10, wherein the seat is retained in the body by the seat screw.

12. The valve of claim 10, wherein the seat comprises a sealing surface, the spindle unit comprises a second seat disc secured to the pin, and the second seat disc is configured to compressively seal against the seat.

13. The valve of claim 12, wherein the spindle unit comprises a second spring biasing the second seat disc toward the seat.

14. The valve of claim 13, wherein the second spring contacts the body, the body being integrally formed.

15. The valve of claim 10, wherein the seat defines a second third void in fluid communication with the fluid passage.

16. A valve for conveying fluid, the valve comprising:
a bonnet secured to a body, the body defining a first port, a second port, and a third port;
a flexible diaphragm compressed between the bonnet and the body;
a first spring disposed in the bonnet; and
a spindle unit disposed in the body and comprising:
  a pin;
  a first seat disc disposed between the pin and the diaphragm, the first seat disc and the pin defining a first void, the first spring biasing the diaphragm toward the first seat disc;
  a seat screw engaged with the body and slidably engaged with the pin, the seat screw and the pin defining a fluid passage in fluid communication with the first void; and
  a seat retained in the body by the seat screw;
wherein the second port is in fluid communication with the fluid passage and the third port is in fluid communication with an undersurface of the diaphragm.

17. The valve of claim 16, wherein the valve is configured to have (a) a first position where the first port and the second port are in internal fluid communication and neither the first port nor the second port are in internal fluid communication with the third port, (b) a second position where the second port and the third port are in internal fluid communication and neither the second port nor the third port are in internal fluid communication with the first port, and (c) a third position where none of the first port, the second port, and the third port are in internal fluid communication.

18. The valve of claim 17, wherein seat defines a second void in fluid communication with the fluid passage and the second port.

19. A valve for conveying fluid, the valve comprising:
a bonnet secured to a body defining a first port, a second port, and a third port;
a flexible diaphragm compressed between the bonnet and the body;
a first spring disposed in the bonnet; and
a spindle unit disposed in the body and comprising:
  a pin;
  a first seat disc disposed between the pin and the diaphragm, the first seat disc and the pin defining a first void, the first spring biasing the diaphragm toward the first seat disc;
  a seat screw threadably engaged with the body and slidably engaged with the pin, the seat screw and the pin defining a fluid passage in fluid communication with the first void;
  a seat retained in the body by the seat screw and slidably engaged with the pin;
  a second seat disc secured to the pin and configured to sealingly engage the seat;
the valve being configured to have (a) a first position where the first port and the second port are in internal fluid communication and neither the first port nor the second port are in internal fluid communication with the third port, (b) a second position where the second port and the third port are in internal fluid communication and neither the second port nor the third port are in internal fluid communication with the first port, and (c) a third position where none of the first port, the second port, and the third port are in internal fluid communication;
wherein (a) in the first position, the second seat disc is disengaged from the seat and the first seat disc is sealingly engaged with the pin, (b) in the second position, the second seat disc is sealingly engaged with the seat and the first seat disc is disengaged from the pin, and (c) in the third position, the second seat disc is sealingly engaged with the seat and the first seat disc is sealingly engaged with the pin.

20. The valve of claim 19, further comprising:
an o-ring compressed between the diaphragm and the body;
a bonnet screw threaded into the body to secure the bonnet with respect to the body, the bonnet screw being disposed above the o-ring such that downward force applied by the bonnet screw to the bonnet is at least partially transmitted to the o-ring via the diaphragm.

* * * * *